United States Patent
Dasher et al.

(10) Patent No.: US 12,535,889 B2
(45) Date of Patent: Jan. 27, 2026

(54) CONTACT OR CONTACTLESS INTERFACE WITH TEMPERATURE HAPTIC FEEDBACK

(71) Applicant: Adeia Guides Inc., San Jose, CA (US)

(72) Inventors: Charles Dasher, Lawrenceville, GA (US); Evgeny Kaminsky, Hallandale Beach, FL (US); Jean-Yves Couleaud, Mission Viejo, CA (US)

(73) Assignee: Adeia Guides Inc., San Jose, CA (US)

( * ) Notice: Subject to any disclaimer, the term of this patent is extended or adjusted under 35 U.S.C. 154(b) by 159 days.

(21) Appl. No.: 18/540,560

(22) Filed: Dec. 14, 2023

(65) Prior Publication Data
US 2025/0271934 A1    Aug. 28, 2025

(51) Int. Cl.
*G06F 3/041* (2006.01)
*G06F 3/01* (2006.01)

(52) U.S. Cl.
CPC ............ *G06F 3/016* (2013.01); *G06F 3/0416* (2013.01)

(58) Field of Classification Search
CPC ................................. G06F 3/016; G06F 3/0416
See application file for complete search history.

(56) References Cited

U.S. PATENT DOCUMENTS

| | | | |
|---|---|---|---|
| 7,062,365 B1 | 6/2006 | Fei | |
| 8,470,701 B2 | 6/2013 | Rogers et al. | |
| 9,291,359 B2* | 3/2016 | Fadell | ............. G01J 5/0025 |
| 11,686,493 B2* | 6/2023 | Jones | ............. G06F 3/04847 |
| | | | 700/276 |
| 2005/0007347 A1 | 1/2005 | Anastas et al. | |
| 2008/0231601 A1 | 9/2008 | Fyke et al. | |
| 2014/0262128 A1* | 9/2014 | Barnes | ............. G06F 1/1626 |
| | | | 165/11.1 |
| 2016/0084517 A1* | 3/2016 | Sugiyama | ............. G06F 3/0486 |
| | | | 236/1 C |
| 2016/0132116 A1 | 5/2016 | Grant et al. | |

(Continued)

FOREIGN PATENT DOCUMENTS

DE    102012202967 A1    8/2013

OTHER PUBLICATIONS

"Apple's patent for an LCD display that also takes photos, video," Apple Insider, Mar. 26, 2008, https://appleinsider.com/articles/08/03/26/apples_patent_for_an_lcd_display_that_also_takes_photos_video.html Retrieved from the Internet Feb. 2, 2024.

(Continued)

*Primary Examiner* — Tadesse Hailu
(74) *Attorney, Agent, or Firm* — HG Law LLP

(57) ABSTRACT

Described are devices that provide thermal haptic feedback. A touchpad, touchscreen or other such device may receive an indication of an adjustment at a first portion of a touch user interface, and in response, determine a temperature setting based on the adjustment. Voltage supplied to a matrix of temperature actuating elements at the touch user interface may then automatically control the haptic temperature feedback. Color and brightness correction may be provided to account for the heat of the temperature actuating elements. Also, the thermal haptic feedback may be provided by a trackball. In response to an adjustment of a value of a parameter effected by the trackball, the medium may automatically control one or more temperature actuating elements in the trackball to provide a haptic temperature feedback.

20 Claims, 15 Drawing Sheets

(56) References Cited

U.S. PATENT DOCUMENTS

| | | | | |
|---|---|---|---|---|
| 2016/0299629 | A1* | 10/2016 | Doyle | G02F 1/13338 |
| 2017/0243453 | A1 | 8/2017 | Birnbaum et al. | |
| 2019/0064997 | A1* | 2/2019 | Wang | G06F 3/04886 |
| 2019/0250710 | A1* | 8/2019 | Yi | A63F 13/28 |
| 2020/0341552 | A1 | 10/2020 | Yi et al. | |
| 2021/0141459 | A1 | 5/2021 | Wang et al. | |
| 2022/0176240 | A1 | 6/2022 | Aurongzeb et al. | |
| 2022/0193538 | A1 | 6/2022 | Goh et al. | |
| 2022/0396121 | A1* | 12/2022 | Tarchala | B60H 1/00742 |
| 2023/0406061 | A1* | 12/2023 | Dede | B60K 35/22 |
| 2024/0201783 | A1* | 6/2024 | Choi | G06F 1/163 |
| 2024/0329745 | A1* | 10/2024 | Rajanna | G06F 3/04883 |
| 2025/0199615 | A1 | 6/2025 | Dasher et al. | |
| 2025/0278138 | A1* | 9/2025 | Rubin | G06F 3/017 |

OTHER PUBLICATIONS

"How To—Range SlidersHow To—Range Sliders," https://www.w3schools.com/howto/howto_js_rangeslider.asp Retrieved from the Internet Feb. 2, 2024.

"TEC Controllers | Peltier Controllers," https://www.meerstetter.ch/products/tec-controllers Retrieved from the Internet Feb. 2, 2024.

"Thermoelectric Coolers," https://lairdthermal.com/products/thermoelectric-cooler-modules Retrieved from the Internet Feb. 2, 2024.

"Top 10 Thermally Conductive Materials," https://thermtest.com/thermal-resources/top-10-resources/top-10-thermally-conductive-materials Retrieved from the Internet Feb. 2, 2024.

Badillo-Ruiz et al., "Design of Nano-Structured Micro-Thermoelectric Generator: Load Resistance and Inflections in the Efficiency," Entropy, 21(224):1-12 (2019).

Chen et al., "Nanostructured thermoelectric materials: Current research and future challenge," Progress in Natural Science: Materials International, 22(6):535-549 (2012).

Elyammy et al., "High Power Thermoelectric Generator Based on Vertical Silicon Nanowires," Nano Lett., 20:4748-4753 (2020).

Goldsmid, "Bismuth Telluride and Its Alloys as Materials for Thermoelectric Generation," Materials, 7:2577-2592 (2014).

Li et al., "Si and SiGe Nanowire for Micro-Thermoelectric Generator: A Review of the Current State of the Art," Frontiers in Materials, 8:1-24 (2021).

Maksymuk et al., "Highly efficient bismuth telluride-based thermoelectric microconverters," Materials Today Energy, Abstract only (2021).

Norem "Apple Granted Patent to Hide the iPhone's Notch, Embed Camera in Display," https://www.extremetech.com/extreme/333909-apple-granted-patent-to-hide-the-iphones-notch-embed-camera-in-display (2022) Retrieved from the Internet Feb. 2, 2024.

Smith "Wow, Is Apple's Vision Pro Loaded With Pixels Cupertino's pace-setter AR/VR display leaves the metaverse in the metadust," https://spectrum.ieee.org/apple-vision-pro (2023) Retrieved from the Internet Feb. 2, 2024.

Tazwar, "Nano Thermoelectric Generator for Wireless & Biomedical Sensors," IEEE 2019 International Conference, Abstract only (2019).

Vieira et al., "High-Performance μ-Thermoelectric Device Based on Bi2Te3/Sb2Te3 p-n Junctions," ACS Appl. Mater. Interfaces, 11(42):38946-38954 (2019) Abstract only.

U.S. Appl. No. 18/540,565, filed Dec. 14, 2023, Charles Dasher.

* cited by examiner micro-OLED pixels — 113

TEC nanoelements 115

401
403a
403b

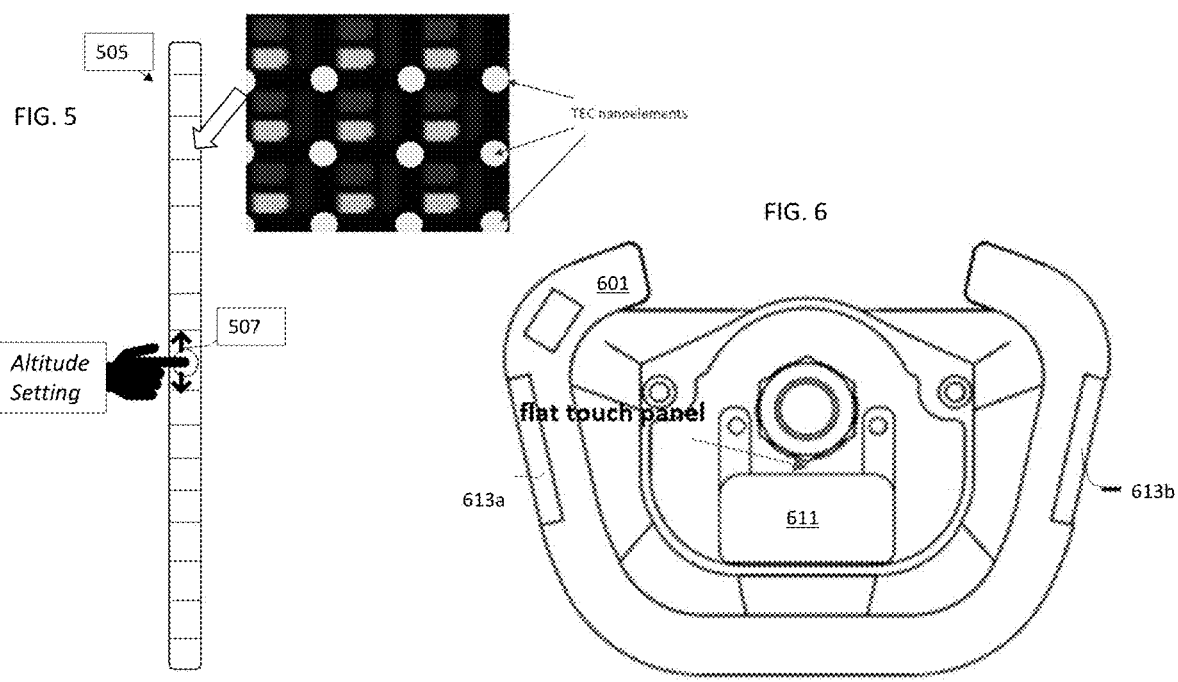

```css
.slidecontainer {
    width: 100%; /* Width of the outside container */
}
/* The slider itself */
.slider {
    -webkit-appearance: none; /* Override default CSS styles */
    appearance: none;
    width: 100%; /* Full-width */
    height: 25px; /* Specified height */
    background: #d3d3d3; /* Grey background */
    outline: none; /* Remove outline */
    opacity: 0.7; /* Set transparency (for mouse-over effects on hover) */
    -webkit-transition: .2s; /* 0.2 seconds transition on hover */
    transition: opacity .2s;
}

/* Mouse-over effects */
.slider:hover {
    opacity: 1; /* Fully shown on mouse-over */
}

/* The slider handle (use -webkit- (Chrome, Opera, Safari, Edge) and -moz- (Firefox) to override default look) */
.slider::-webkit-slider-thumb {
    -webkit-appearance: none; /* Override default look */
    appearance: none;
    width: 25px; /* Set a specific slider handle width */
    height: 25px; /* Slider handle height */
    background: #04AA6D; /* Green background */
    cursor: pointer; /* Cursor on hover */
}

.slider::-moz-range-thumb {
    width: 25px; /* Set a specific slider handle width */
    height: 25px; /* Slider handle height */
    background: #04AA6D; /* Green background */
    cursor: pointer; /* Cursor on hover */
}
```

FIG. 11

CONTACT OR CONTACTLESS INTERFACE WITH TEMPERATURE HAPTIC FEEDBACK

BACKGROUND

Embodiments of the present disclosure relate to touchscreens, trackballs, trackpads and other devices used to control parameters and that provide thermal haptic feedback. Some disclosed embodiments or aspects may relate to heating and/or cooling Peltier devices integrated with liquid crystal displays (LCDs), organic light-emitting diode displays (OLEDs) or other LEDs, and other features, functionalities, or fields.

SUMMARY

Touchscreens, touch panels, trackpads, trackballs and many other human-machine interfaces allow for two-way communication between a user's finger or hand and a device. The user manipulates a controller to command the device, for example, to control a setting of a target parameter, and the device may display the target setting to provide visual feedback in response to the command received.

A technological problem is that to perceive such feedback the user may have to look at the device. This may be inconvenient, particularly, in situations in which the user's attention is directed elsewhere, such as when driving a vehicle, playing a game, or immersed in another activity requiring concentration. Also known are systems in which a device provides audio feedback to the user in response to a user command. However, audio feedback, too, may draw attention away from a user activity and, in any case, a user may be wearing headphones or listening to something else with which the audio feedback may interfere or which may drown out or render unintelligible the audio feedback.

Another technological problem is that visual and audible feedback are limited by the language of the feedback and may fail to provide an intuitive feeling to the user. For example, a user attempting to set a temperature using a virtual slider of a touchscreen may not understand that the target setting feels colder than the current ambient temperature. The user may not understand the language in which visual or audible feedback is provided or, even if the user understands the language, the user may not receive the visual or audible feedback in an intuitive, tactile way. Also known is feedback in which vibrations or shaking sensations are provided to the user. However, such feedback may be detrimental when the user is concentrating or engaged in work using hands that require precision, such as when driving. Also, it may be unclear to the user what vibrations or shaking are supposed to be signify.

According to an aspect of the disclosure, a controller provides haptic feedback in the form of a temperature change conveyed to the finger, palm or other portions of a hand or arm of the user. Thermoelectric coolers (TECs), sometimes known as thermoelectric heat pumps or Peltier devices, may be arranged inside a device to provide cutaneous feedback to the user. For example, a grid of TECs may be positioned between a liquid-crystal display (LCD) panel, or may be positioned behind (or in front of) an (organic light-emitting diode) OLED panel. Or, the grid of TECs may be positioned between the touchscreen layer and the LCD or OLED display panel. The TECs may be small in size and positioned at each pixel of the display, or several pixels may share one TEC. In an embodiment, thermal haptic feedback need not provide the same level of granularity or resolution as the visual information, and thus only one TEC may be provided surrounded (when viewed from above) by four or more pixels. As the user's finger moves a virtual handle of a virtual slider to indicate a colder temperature for a room or vehicle, TECs at or near the portion of the display at or near the virtual slider handle would be controlled to a colder or hotter temperature. The user would feel a sensation relatively colder or hotter than remaining portions of the virtual slider and/or relatively colder or hotter than remaining portions of the touchscreen. This type of feedback, which may be provided in addition to visual and/or audio feedback, may communicate in a more intuitive way a target setting, or may communicate a direction of the adjustment in the setting, may be unimpeded by language barriers or by user vision or hearing impairments, and, more generally, may improve machine-user interaction and enhance user experience.

In an embodiment, the temperature provided as the thermal haptic feedback may indicate a change relative to a current temperature of the glass touch panel of the device, or may indicate a change relative to a current temperature of other portions of the glass touch panel of the device. For example, in response to the user moving the handle of the slider to a setting in the cold direction, the device may generate thermal haptic feedback that feels colder than the current temperature, or feels colder than when the slider handle was at its position before movement. In response to further movement of the slider handle along the slider in this same direction, the device may generate thermal haptic feedback that feels a bit colder than at the previous position. However, these feedback temperatures may or may not correspond precisely to actual ambient temperature settings that the slider is meant to indicate, or to actual ambient temperatures that will be attained for the space by the air conditioning system or heating system. For example, for controls for an electric burner, the thermal haptic feedback temperature may be in the range of a few degrees, whereas the actual temperature of the plate may span hundreds of degrees. Further, the haptic feedback may not necessarily provide the coldest or the hottest actual ambient temperature setting that the slider is meant to indicate or that can be attained for the space by the air conditioning or heating systems. In an embodiment, the thermal haptic feedback may indicate a precise temperature corresponding to an actual target ambient temperature setting, or an approximation thereof.

Color correction and brightness correction of a visual output of the touchscreen may be necessary because the local temperature provided as the haptic feedback by the TECs may alter the color and brightness of a portion of the display as seen by the user. Color correction may entail compensating for the color change caused by the local heating/cooling: at the portion of the display heated or cooled by the TECs to provide the haptic feedback, and/or at neighboring portions of the display, the color that is provided by the pixels of LCD/LED/OLED matrix of the display may be changed such that when exposed to the temperature provided by the TECs the color obtained is the target color. Similar local compensation may be necessary for brightness distortion caused by the TECs in providing the haptic feedback. A matrix of temperature sensors may be provided throughout the display, or at a portion of the display providing the Graphical User Interface (GUI) at which haptic feedback is provided, to provide real time temperature feedback to the system for color and brightness correction.

While the haptic feedback would be in the form of a temperature change palpable to the user's finger or hand, the thermal haptic feedback may represent types of parameters other than ambient temperature settings. In this way, the haptic temperature feedback may be used as an indication for signaling settings other than temperature settings. For example, a slider may control the volume of a sound system in a room or in an automobile, such that in response to sliding the slider handle to a louder setting, the system may provide a hotter haptic feedback. In such an implementation, in response to higher volume settings, greater heat may be palpable to the user. Similarly, the temperate-based haptic feedback may represent a greater speed setting of a vehicle rendered in a video game, a greater altitude setting for a flying drone, a greater tilt or greater field of view setting of an adjustable mirror of a vehicle, a higher frequency band setting of a tuner of a car radio, a greater magnification setting for a zoom feature of a camera or a computer monitor, a sharper turn indicated by a steering wheel of a vehicle. More generally, hotter or colder thermal haptic feedback may indicate greater intensity or magnitude of a value or parameter. While sometimes described with regard to a virtual slider of a touchscreen, other graphical user interface widgets, including cycle buttons, menus, toggle switches, spinners, radio buttons, scrollbars and the like are also contemplated.

Described is a device, system, non-transient computer-readable medium, method, and means for implementing the method for providing thermal haptic feedback by a touchscreen or other such device. Such a method may include: receiving an indication of an adjustment at a first portion of a touch user interface; determining a temperature setting based on the adjustment at the first portion of the touch user interface; and controlling a matrix of temperature actuating elements at the touch user interface to provide a haptic temperature feedback by causing a first temperature actuating element of the matrix of temperature actuating elements to provide a temperature output based on the temperature setting. The first temperature actuating element may be positioned at the first portion of the touch user interface, and temperature actuating elements of the matrix of temperature actuating elements positioned outside the first portion of the touch user interface may be controlled not to provide the temperature output provided by the first temperature actuating element.

The first portion of the touch user interface may be a moveable graphical user interface widget. The first portion of the touch user interface may be a point of user physical contact with the touch user interface, or the system may determine a future likely point of user physical contact with the touch user interface, such that the first portion of the touch user interface is the future likely point of user physical contact with the touch user interface.

The matrix of temperature actuating elements may include Peltier devices arranged at each pixel of the pixel matrix of the device. More of the Peltier device may be positioned at a portion of the touch user interface providing the moveable graphical user interface widget than at comparably sized other portions of the touch interface. Portions of the touch interface other than at the first portion may or may be not controlled to provide any temperature output.

The system may receive temperature readings from a matrix of temperature sensors at the touch interface, and color output by one or more pixels at the first portion of the touch user interface may be corrected based on the temperature readings.

The user interface may control a variety of settings, for example, ambient temperature setting for a space may be controlled according to the adjustment at the first portion of the touch user interface. For example, based on user input received at the user interface, a control signal may be generated and may be transmitted or provided to one or more control units or systems in a vehicle to adjust a controlled variable to a desired setpoint or target. In some instances, the control signal (sometimes simply called a "signal") indicates an increment or decrement to a controlled variable (e.g., rather than a specific desired target). For example, a climate control system in the vehicle may have a current desired temperature set to 72 degrees F. The user may interact with the user interface to increase the desired temperature to 75 degrees F. When the user touches the user interface to increase the desired temperature, the area with which he interacts may be relatively warmer than other areas of the user interface, providing temperature feedback to the user to indicate to the user by way of touch that he is increasing the desired temperature. Based on the user input, the system may generate a signal for the climate control system indicating an increase in desired temperature (e.g., indicating a desired temperature of 75 degrees F., indicating an adjustment corresponding to the 3 degrees F. increase in desired temperature, indicating an adjustment of 5% based a range of possible temperatures of airflow, etc.). The climate control system may adjust the temperature of airflow provided from the vents to the cabin accordingly. In some instances, the signal may indicate a desired target or adjustment in fan speed, window position, seat temperature, seat position, pedal position, steering wheel position, steering wheel temperature, cruise control speed, desired distance to a leading vehicle while in cruise control, light status for interior or exterior lights (e.g., activation/deactivation, brightness level, color temperature, etc.), audio control (e.g., changing stations/channels, changing volume/bass/treble/, balance; changing audio sources; etc.), etc. Depending on the nature of the signal, the signal may be provided to the relevant control unit or system in the vehicle that is configured for controlling the variable in question.

Instructions encoded as a markup language may be transmitted to the touchscreen device. Such markup language instructions may control pixel color and corresponding temperature data, and the temperature setting for a pixel, or for a group of pixels, may be performed according to the corresponding temperature data.

Also, described is a trackball or trackpad embodiment, in which one or more TECs provide haptic temperature feedback in response to an adjustment in a value caused by movement of the trackball or trackpad. The palm or another portion of the hand of a user would feel the change in temperature in real time according to the magnitude of the adjustment of the value. The trackball may be utilized to generate a signal for relevant control units or systems in the same manner as described regarding the touch user interface.

Such a trackball or trackpad may be built into, or added on, another controller, such as a vehicle steering wheel, a controller on a vehicle dashboard, a joystick, a computer keyboard, a computer mouse, a game controller, or the like. The controller providing the haptic temperature feedback may be a hand controller that adjusts settings visible on a head-up display (HUD). A joystick used to control a virtual vehicle, such as a racecar or airplane, of a video game may include one or more TECs, and if the user controls the joystick to indicate a faster speed for the vehicle, the one or more TECs may be controlled to provide more heat. The user's hand would thus receive haptic feedback in the form of temperature to indicate a relatively greater speed indicated for the vehicle.

In a steering wheel implementation, such a haptic feedback providing device may be provided at more than one portion of the steering wheel so that both hands of a user may receive the haptic feedback. Or, a first haptic feedback providing device, for example, at a left side of the steering wheel, may provide haptic feedback that indicates a rate of acceleration of the vehicle as dictated by the depression of the accelerator pedal by the driver, while a second haptic feedback providing device on the steering wheel may indicate a speed a current speed of the vehicle.

Described is a device, system, non-transient computer-readable medium, method, and means for implementing the method for providing thermal haptic feedback by a trackball or other such device. Such a method may include: receiving an indication of an adjustment of a value caused by a movement of a trackball; determining a temperature setting based on the adjustment of the value; and controlling a temperature actuating element in the trackball to provide a haptic temperature feedback by causing the temperature actuating element to provide a temperature output at a surface of the trackball based on the temperature setting.

In the trackball embodiment, the adjustment of the value caused by the movement of the trackball may be indicated on a display logically connected to the trackball. The temperature actuating element may be a Peltier device positioned at a center of a touchpad of the trackball. The Peltier device positioned in the trackball may be in physical contact with a heatsink, or may be in physical contact with a metallic wire positioned to conduct heat away from the thermoelectric element.

The trackball may have a casing made of a plastic upper portion positioned at the touch sensor, and a metallic lower portion. For example, the plastic upper portion may be a majority of the casing. The trackball may be integrated with a steering wheel of a vehicle.

Other aspects and features of the present disclosure will become apparent to those ordinarily skilled in the art upon review of the following description of specific embodiments in conjunction with the accompanying figures.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 5 illustrates an example of a GUI widget, which includes thermal haptic feedback providing TECs, used to control a parameter unrelated to ambient heating;

FIG. 6 illustrates examples of thermal haptic feedback providing touch panels provided as part of, or on, a steering wheel of a vehicle, according to an aspect of an embodiment of the disclosure;

FIG. 11 is an example of markup instructions for a slider and slider handle widget of a graphical user interface, according to an embodiment;

DETAILED DESCRIPTION

Figure 1:
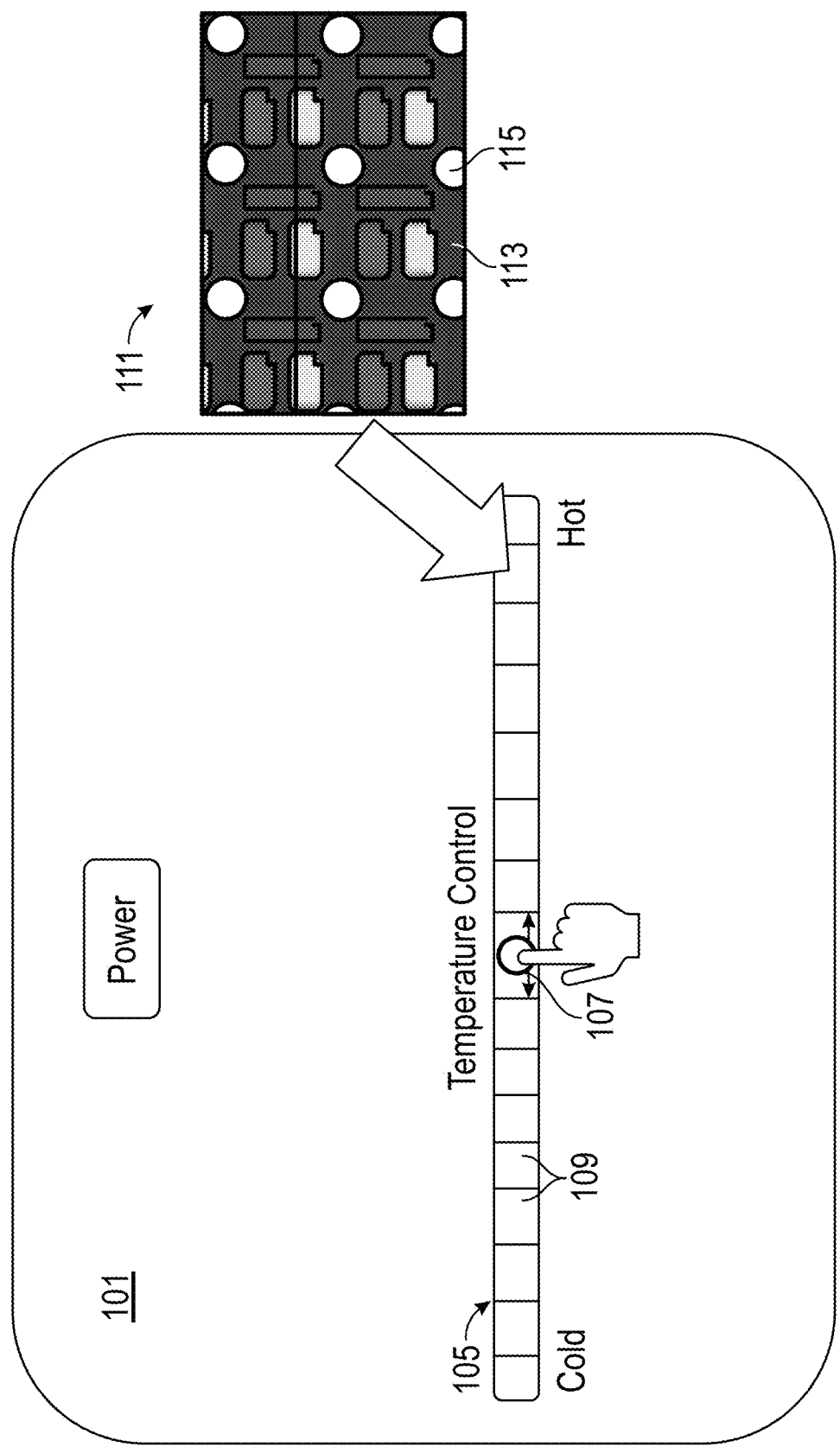
FIG. 1 illustrates an example of a user interacting with a graphical user widget, shown as a slider, of an LCD, OLED or other LED touchscreen to control a setting, and shows a grid of thermoelectric temperature control elements positioned at the matrix of pixels of the display to provide thermal haptic feedback, according to an aspect of an embodiment of the disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

FIG. 1 illustrates an embodiment of a touchscreen 101 that may have one or more graphical user interface (GUI) elements, illustrated by way of example in FIG. 1 as a slider 105 with slider handle 107. Touchscreen 101 may be part of a dashboard console of an automobile or may be standalone device, such as a portable or handheld device. Also shown in FIG. 1 are grid lines 109 to aid in the user seeing distances on the slider 105. The graphical user element widget shown in this illustration in FIG. 1 as a slider 105 may control settings for a variety of parameters and devices, or may control heating/air conditioning system that controls ambient temperature. Some of the figures illustrate examples of touchscreens, however, other types of data processor-based devices, including desktops, laptops and other portable computers with touch pads, touch sensitive displays, or the like, including handheld devices, such as tablets, are also contemplated. Also, while explained with reference to a GUI widget controller, the user input may be via a keyboard, computer mouse, trackpad, joystick or the like to a processor connected to a visual display, such that the thermal haptic feedback is provided by the keyboard, computer mouse, trackpad, joystick or the like.

As further shown in FIG. 1, pixels 113 of the LCD/LED/OLED matrix 111 of the touchscreen 101 may also include, or may be positioned, below or on top of a grid of thermoelectric elements 115 to provide thermal haptic feedback to the user. The thermoelectric temperature control elements may be thermoelectric coolers (TECs) arranged inside the touchscreen 101 to provide real time cutaneous feedback to the user's finger or hand. It will be understood that the TECs, sometimes known as thermoelectric heat pumps or Peltier devices, may be used to heat or to cool, regardless of the nomenclature.

The system may control the grid of thermoelectric elements to provide the thermal haptic feedback along some of the points of the slider 105 as the user's finger moves the slider handle 107 along slider 105. In an embodiment, the system may control the thermoelectric grid to provide the thermal haptic feedback only when after the movement of the slider handle 107 has been stopped, for example, after the slider handle 107 stopped moving for 0.1-10 seconds, or after the slider handle 107 stopped moving for 0.1-5 seconds.

Figure 2:
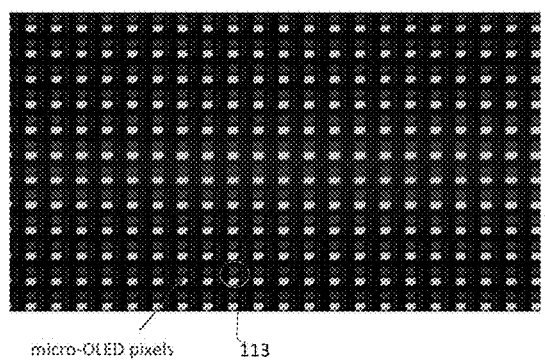
FIG. 2 illustrates an example of a pixel matrix that includes three color subpixels.

FIG. 2 illustrates RGB (red, green and blue) subpixels that comprise pixels of an OLED or LCD display that comprises the touchscreen or touch panel. As shown, each pixel includes a red, green and blue subpixel, each of which may be individually activated.

Figure 3:
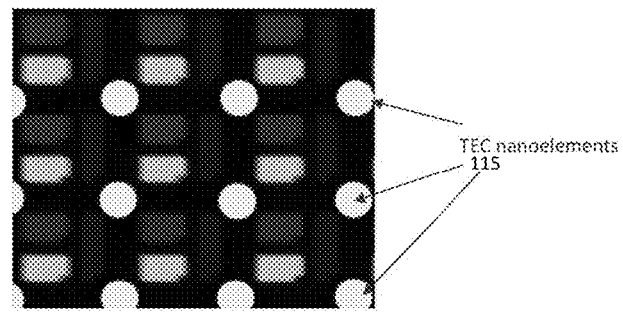
FIG. 3 illustrates an examples of a pixel matrix that includes three color subpixels and thermoelectric cooling/heating elements (TECs), according to an aspect of an embodiment of the disclosure.

FIG. 3 illustrates thermoelectric elements 115 provided as thermoelectric coolers (TECs) or thermoelectric heat pumps, also known as solid state Peltier devices. A thermoelectric element 115 may be provided adjacent each pixel or several pixels may share a thermoelectric element 115. In an embodiment, the thermoelectric elements 115 may be positioned sufficiently close that they provide thermal haptic feedback that is granular, such that the haptic feedback may be palpable to the user as different temperatures at visually distinguishable adjacent points along the slider 105. In this way, if adjacent points on the slider 105 are readily visually distinguishable to the naked eye of the user, then those points may provide thermal haptic feedback that feels different to the user. For example, a higher voltage may be applied to drive the thermoelectric elements 115 at a first point of the slider 105 to a lower (or higher) temperature than at other points along the slider 105, or more of the thermoelectric elements 115 at the first point may be activated than at a second point that appears nearby along the slider 105. In an embodiment, sliding the slider handle 107 anywhere between a given pair of adjacent grid lines may cause the system to provide the same temperature haptic feedback.

In an embodiment, the system provides thermal haptic feedback only to indicate relative temperature compared with a previous position of the slider handle 107, or compared with a current ambient temperature, but the thermal haptic feedback does not correspond to a target temperature indicated by the visual information indicated by the slider 107 or to target ambient temperature for the space. In such an embodiment, the aim of the thermal haptic feedback may be to indicate a direction of the target setting, for example, cold, or colder than present, or colder than a setting indicated by a previous position of the slider handle 107. In another embodiment, the thermal haptic feedback corresponds to the target ambient temperature or corresponds to the setting information indicated on/by the slider 105.

In an embodiment, the temperature range generated as the haptic feedback may be preset according to the comfort level of the user. For example, a user may be more sensitive to cold and thus may preset a smaller range of haptic feedback temperature values to avoid exposing the finger or hand of the user to suddenly experience more extreme temperate haptic feedback. Accordingly, the TEC temperature controller may adjust voltage applied at the TECs along the slider based on the narrower temperature range selected.

Temperature sensors (not shown) may be positioned at one or more of the TEC elements 115 to monitor the temperature and to provide real time feedback to the control system of the device 101. Temperature sensors may be positioned to detect the temperature of each of the two sides of the TEC element. Heatsinks (not shown) may also be positioned at one or more TECs 115 to conduct heat away from the TECs. This may be useful to prevent overheating of the OLED display. Also, since a TEC often maintains a near constant relative temperature gradient between the two sides of the TEC as voltage continued to be increased, a heatsink may be useful to cool a hot side of the TEC so as to bring the cool side of the TEC to an even colder temperature at any given voltage. The heatsink may be one or more metal plates, one or more metal radiators, one or more metal wires, such as copper wires, or a combination of the foregoing, in direct physical contact with the TEC.

Figure 4:
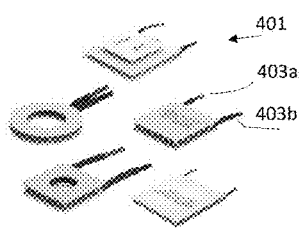
FIG. 4 illustrates examples of TECs.

FIG. 4 illustrates thermoelectric coolers (TECs) 401 or thermoelectric heat pumps, also known as solid state Peltier semiconductor devices, according to the related art. The TEC may be made of two electrically conductive materials with differing thermal conductive properties. Positive and negative connections 403a, 403b may be used to apply voltage across a TEC 401. Reversing the voltage applied to the two sides of the TEC 401 would reverse which side of the TEC 401 is being cooled and which side is being heated.

FIG. 5 shows a slider 505 with a slider handle 507 for controlling altitude of a flying drone or of an element in a videogame. The slider 505 may be GUI element of a display with an LCD matrix 111 that includes TECs 115. Many other types of parameters may be controlled by similar sliders 505 that provide thermal haptic feedback in this way.

FIG. 6 illustrates a steering device 601 with built in touch panels 613a, 613b and 611. Touch panels 613a, 613b and 611 may each have one or more GUI widgets for controlling settings of various systems and devices, for example, to control ambient temperature of the vehicle. Touch panels 613a, 613b and 611 may be located at portion of the steering wheel 601 designed to be typically or often grasped by the driver.

In an embodiment, touch panels 613a, 613b may each have just one or just a few TECs so as to provide thermal haptic feedback to the hand regardless of where the touch panels 613a, 613b are touched. A touch panel 611 may be incorporated or provide at a central portion of the steering wheel 601 instead or, or in addition to, the touch panels 613a, 613b. In an embodiment, touch panel 611 may be touchscreen or touchpad that receives user commands, for example, through a GUI widget, which touch panels 613*a*, 613*b* provide the thermal haptic feedback indicating the parameter controlled via the GUI widget provided on touch panel 611.

In an embodiment, touch panels 613*a*, 613*b* may provide thermal haptic feedback to the user with left and right hands on the steering device 601 without receiving user input but merely provide thermal haptic feedback. For example, based on the vehicle's speed as controlled by the driver using the vehicle's controls, the touch panels 613*a*, 613*b* may provide an intuitive haptic feedback regarding parameters such as relative speed and/or acceleration of the vehicle. In this way, the touch panel 613*b* may provide an indication of speed of the vehicle relative to a previous speed of the vehicle, for example, relative to a speed before the driver began depressing the accelerator pedal, relative to a standard or average speed of vehicles for this road or this portion of this road, or relative to other vehicles currently in the vicinity of the present vehicle.

In an embodiment, touch panels 613*a*, 613*b* may work in concert to provide feedback on related parameters. For example, the touch panel 613*a* may provide thermal haptic feedback indicating acceleration of the vehicle while the touch panel 613*b* may provide thermal haptic feedback indicating speed of the vehicle. Warmer temperatures may indicate faster relative speed or more rapid acceleration. In an embodiment, touch panels 613*a*, 613*b* do incorporate a touchscreen that provides GUI widgets to receive user input.

Figure 7:
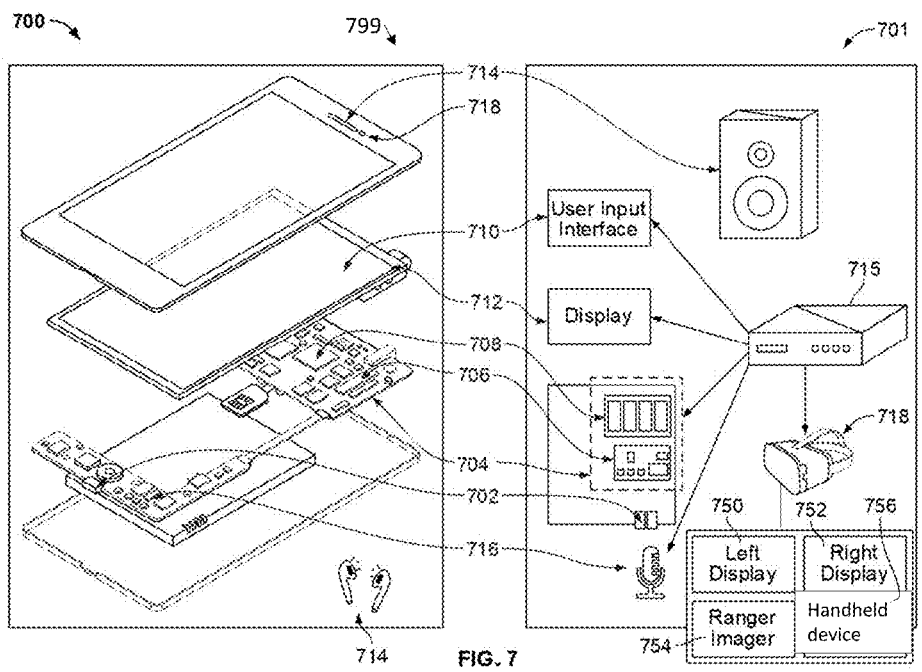
FIG. 7 illustrates an example of a computer device and accessories/components thereof according to an aspect of an embodiment of the disclosure.

FIG. 7 illustrates components and related hardware for applications of the device 101, that implements providing thermal haptic feedback as described herein. A circuit board may include control circuitry, processing circuitry, and storage (e.g., RAM, ROM, hard disk, removable disk, etc.). In some embodiments, the circuit board may include an input/output path. Each device 700/701 may be thought of or comprise a system 799 that may receive content and data via input/output (I/O) path 702 that may comprise I/O circuitry (e.g., network card, or wireless transceiver). I/O path 702 may communicate over a local area network (LAN) or wide area network (WAN).

Control circuitry 704 may comprise processing circuitry 706 and storage 708, and may comprise I/O circuitry. Control circuitry 704 may be used to send and receive commands, requests, and other suitable data using I/O path 702, which may comprise I/O circuitry. I/O path 702 may connect control circuitry 704 (and specifically processing circuitry 706) to one or more communications paths (described below), and may receive notifications and transmit them, for example, via an operating system of the device and/or via additional applications, to a user communications application as well as to the application that control the touchscreen, trackpad, trackball and the TECs therein. I/O functions may be provided by one or more of these communications paths, but are shown as a single path in FIG. 7 to avoid overcomplicating the drawing.

Control circuitry 704 may be based on any suitable control circuitry such as processing circuitry 706. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i9 processors) or multiple different processors (e.g., an Intel Core i9 processor and an Intel Core i7 processor). In some embodiments, control circuitry 704 executes instructions for the application stored in memory (e.g., storage 708). Specifically, control circuitry 704 may be instructed by the application to perform the functions discussed above and below. In some implementations, processing or actions performed by control circuitry 704 may be based on instructions received from the touchscreen, trackball, mouse or other such device.

In client/server-based embodiments, control circuitry 704 may include communications circuitry suitable for communicating with other networks. The application may be implemented as software or a set of executable instructions. The instructions for performing any of the embodiments discussed herein of the application that controls the thermal haptic feedback may be encoded on non-transitory computer-readable media (e.g., a hard drive, random-access memory on a DRAM integrated circuit, read-only memory etc.). For example, in FIG. 7, the instructions may be stored in storage 708, and executed by control circuitry 704 of a device 700.

In some embodiments, the application may be a client/server application where only the client application resides on device 700 (e.g., device 104), and a server application resides on an external device or edge network. Control circuitry 704 may include communications circuitry suitable for communicating with a server, edge computing systems and devices, a table or database server, or other networks or servers Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video recorders, solid state devices, quantum storage devices, gaming consoles, or any other suitable fixed or removable storage devices, and/or any combination of the same. Storage 708 may be used to store various types of content described herein. Nonvolatile memory may also be used (e.g., to launch a boot-up routine and other instructions). Cloud-based storage, described in relation to FIG. 7, may be used to supplement storage 708 or instead of storage 708.

Control circuitry 704 may include video generating circuitry and tuning circuitry. Control circuitry 704 may also include scaler circuitry for upconverting and down converting content into the preferred output format of equipment 700. Control circuitry 704 may also include digital-to-analog converter circuitry and analog-to-digital converter circuitry for converting between digital and analog signals. In some embodiments all elements of system 700 may be inside housing of the display device 718. In some embodiments, display device 718 comprises one or more handheld devices 756.

The application that controls first and second window placement and formatting may be implemented using any suitable architecture. For example, it may be a stand-alone application wholly implemented on each one of user equipment device 700 and user equipment device 701. In such an approach, instructions of the application may be stored locally (e.g., in storage 708), and data for use by the application is downloaded on a periodic basis (e.g., from the edge network, from an out-of-band feed, from an Internet resource, or using another suitable approach). Control circuitry 704 may retrieve instructions of the application from storage 708 and process the instructions to provide generation functionality and preform any of the actions discussed herein. Based on the processed instructions, control circuitry 704 may determine what action to perform when input is received from user input interface 710. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the application may be downloaded and interpreted or otherwise run by an interpreter or virtual machine (run by control circuitry 704). In some embodiments, the application may be encoded in the ETV Binary Interchange Format (EBIF), received by control circuitry 704 as part of a suitable feed, and interpreted by a user agent running on control circuitry 704. For example, the application may be an EBIF application. In some embodiments, the application may be defined by a series of JAVA-based files that are received and run by a local virtual machine or other suitable middleware executed by control circuitry 704. Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network. While sometimes described as an application by way of example, it will be understood that operating systems and other system modules and notifications and outputs are also contemplated.

A virtual reality (VR) or extended reality (XR), including augmented reality (AR) implementation, handheld device 756 may work in concert with the mounted device (HMD) 718 to provide a VR/XR experience. The handheld device 756 may be used to control parameters of the game or other VR/XR application. The handheld device 756 may provide thermal haptic feedback signifying parameters of the game or other VR/XR application.

Figure 8:
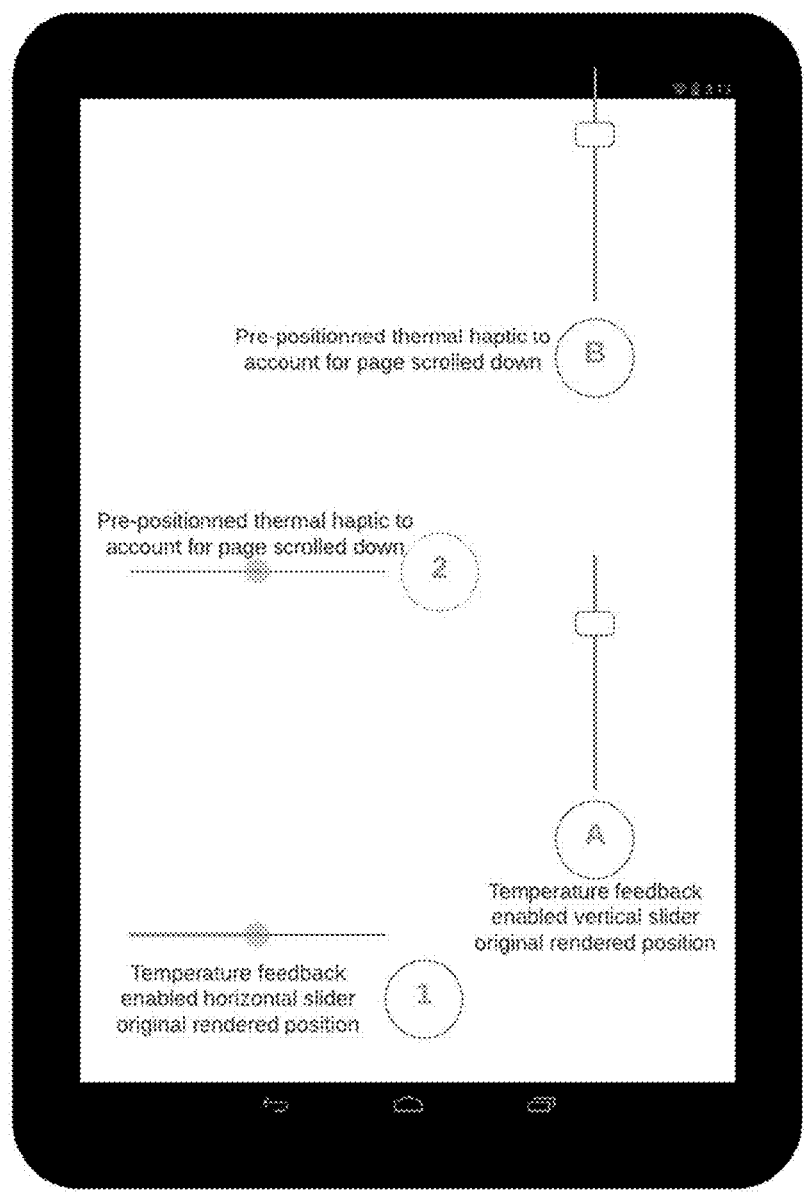
FIG. 8 illustrates an example of a display device with a GUI providing preloaded thermal haptic feedback at a predicted future finger position, according to an aspect of an embodiment.

FIG. 8 illustrates a touchscreen with a graphical user interface that provides GUI slider widgets 1 and A and preloaded thermal haptic feedback GUI slider widgets 2 and B, according to a preloading embodiment of the present disclosure. As illustrated in FIG. 8, the thermal feedback controller may instruct TECs to pre-heat or to pre-cool in areas of the display that are likely to be next touched by the user. At the time of the preloading of the TECs begins, these areas of the display may or may not contain any GUI widgets that entail contact. For example, as the user scrolls or on a next page in a tabulated series, such GUI widgets may be displays. This pre-heating or pre-cooling TECs in areas of the monitor that will after scrolling or on a next page contain the GUI widget may address latency in obtaining the target thermal haptic feedback temperature at the touchscreen.

In an embodiment, the display 101 initiates a repositioning of the GUI widget so as to afford time to preload the TECs of the second portion of the display 101. For example, the display 101 may reposition the GUI slider 105 to a new portion of the display 101 so that the user has to scroll, or at least to reposition his/her finger to a new portion of the display 101. In such an embodiment, when the system determines that it cannot bring the TECs at the first portion of the display 101 in a sufficiently fast time to provide the thermal haptic feedback, for example, within 0.1-5 seconds, then the system may reposition the slider 105 to urge the user to scroll or to turn a virtual page or the like. This may depend on the temperature that the TECs need to provide the thermal haptic feedback—a great temperature change from a current TEC temperature may trigger the system to reposition the slider 105 so that the user has to scroll.

Figure 9:
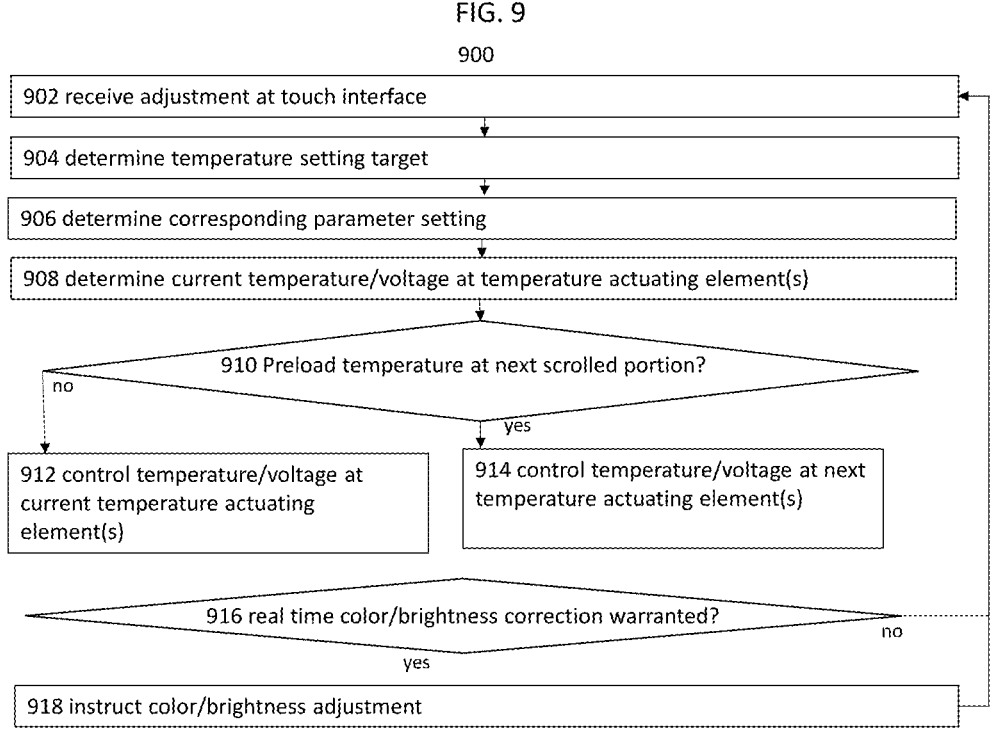
FIG. 9 is a flowchart illustrating an example of a process for automated second window control, according to an embodiment.

FIG. 9 shows an example of a process 900 for thermal haptic feedback control, according to an aspect of the disclosure. The method 1100 may be implemented, in whole or in part, by the touchscreen 101 shown in FIG. 1 and/or the system 799 shown in FIG. 7. One or more actions of the method 900 may be incorporated into or combined with one or more actions of any other process or embodiments described herein. The method 900 may be saved to a memory or storage (e.g., the storage 708 of the system 799 shown in FIG. 7) as one or more instructions or routines, which may be executed by any suitable device or system having access to the memory or storage to implement the method 900.

At 902, the system receives an input to adjust a parameter. The input may be received at a touchscreen or other interface. The parameter may be a temperature parameter that indicates a target ambient temperature or another type of parameter unrelated to ambient temperature.

At 904, the system determines a thermal haptic feedback temperature setting based on the adjustment made at step 902. For example, there may a direct correlation between the increase in the target setting for the parameter being adjusted and the thermal haptic feedback temperature setting. For example, in response to a 10 degree C. adjustment in the target setting for the parameter being adjusted, the system may generate a thermal haptic feedback temperature change of 10 degrees C., or 5-10 degrees C. Or, the thermal haptic feedback temperature may only provide an indication of the direction of change, for example, cooler than now, or cooler than if the GUI slider handle 107 were being moved in the opposite direction.

At 906, the system may determine a setting for the parameter being adjusted by the slider. For example, if the parameter is ambient heat for a vehicle, then the system may determine the temperature setting that corresponds to the temperature indicated by the slider handle 107 after its adjustment. The system may instruct the heating, ventilation, and air conditioning (HVAC) system accordingly, for example, via a local area network (LAN) or via the internet.

At 908, the system may determine a temperature at the present time and/or voltage at the actuating elements that will be providing the thermal haptic feedback. Temperature sensors may be located throughout the TEC grid and/or a voltage applied to the relevant TECs may be measured to estimate temperature, given that the relationship between temperature increase/decrease and the voltage applied to the TECs is known. In any event, voltage at one or more TECs may be measured for real time feedback to the system regarding actual voltage being applied. The system may determine that no adjusting of the temperature of the TECs at the point of contact with the user's hand is necessary as the local TECs at the point of contact are substantially at the target temperature. Or, the system may determine that adjusting of the temperature of the TECs at the point of contact with the user's hand is necessary, in which case voltage needed to bring that point of the TEC grid to the temperature may be applied.

The system at 910 may determine to preload the target thermal haptic feedback temperature at a second portion of the display 101 that will next provide the portion of the slider 105 in contact with the user's hand. This may require the system to make a determination as to a future likely position of the user's finger.

In an embodiment more TECs may be positioned at portions of the display 101 that are likely to provide GUI widgets that are touched by a user. For example, a preprogrammed display 101 provided as part of a vehicle dashboard or cockpit may have preinstalled or downloadable applications that control various systems or components of the vehicle, and thus some common positions of GUI widgets on the display 101 may be known in advance. Such portions of the display 101 may have more TECs, for example, more densely positioned TECs, than other comparably sized areas of the display 101.

If the system at 910 determines that adjusting of the temperature of the TECs at the point of contact with the user's hand is necessary, then at 912 voltage is applied to bring that point of the TEC grid to the temperature is applied. The system determines the amount of voltage to be applied to arrive at the appropriate thermal haptic feedback temperature at the point of contact.

On the other hand, if the system at 910 determines that adjusting of the temperature of the TECs at the next point of contact with the user's hand is necessary, voltage is applied to the second portion of the display 101 where the GUI widget is to be repositioned. The second portion of the OLED display may be a point at which the GUI slider handle 107 is likely to be located after the user scrolls or after the GUI otherwise repositions the slider. The system preloads the thermal haptic feedback by determining the amount of voltage to be applied to arrive at the appropriate thermal haptic feedback temperature at the next point of contact.

The system at 916 may determine whether color and/or brightness correction of pixels at and near the point of thermal haptic feedback is necessary or desirable. A temperature variation, such as heat, outside of an expected operating temperature range, may cause a change in the colors perceived by the user and/or may cause a change in the brightness of the display perceived by the user. If only slight additional heat is required for the thermal haptic feedback then no color/brightness correction may be warranted, and processing returns to 902.

The system at 918 may take corrective action to instruct color and/or brightness adjustment output by the relevant pixels of the display taking into account the thermal distortion caused by the thermal haptic feedback. This process is described in more detail below with regard to FIG. 13. The process may then return to 902.

Figure 10:
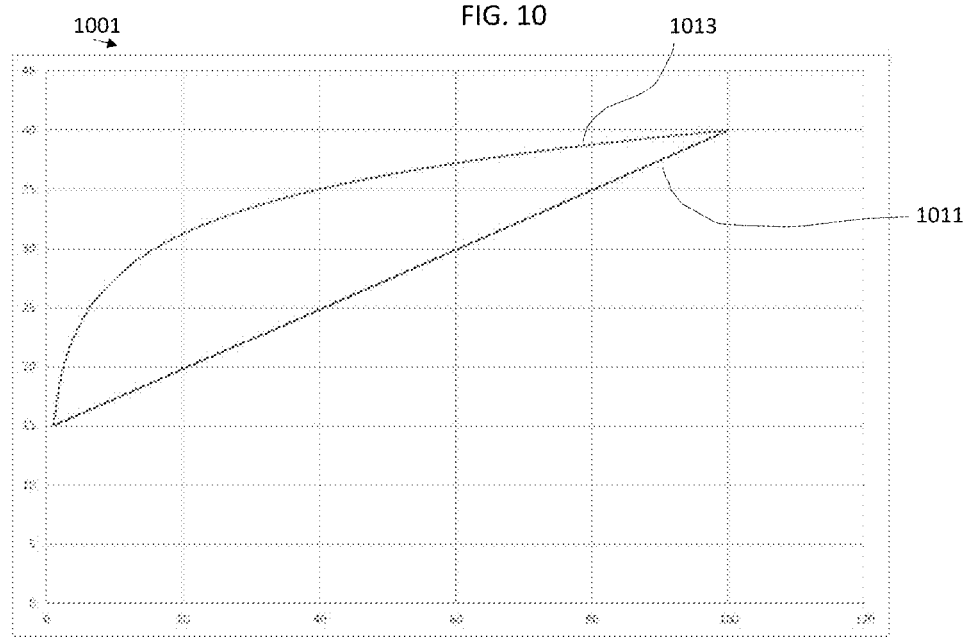
FIG. 10 is a graph showing examples of ambient heating settings and corresponding thermal haptic feedback temperatures, according to an embodiment.

FIG. 10 illustrates a graph 1001 showing some contemplated correlations between a target parameter setting (for example ambient temperature) and the corresponding thermal haptic feedback provided. According to some embodiment, a magnitude of a change to the thermal haptic feedback temperature as provided to the user may be correlated in several ways with the magnitude of the change in the value of the adjusted ambient temperature setting. According to some embodiment, the magnitude of the change to the thermal haptic feedback temperature as provided to the user may be correlated in several ways with the value adjustment that is displayed by the graphical user interface controlled by the touch screen or by the trackball/trackpad/mouse or the like. The target parameter output settings are shown on the X-axis, in the examples illustrated between 1 degrees C. and 100 degrees C. The thermal haptic feedback temperatures are shown on the Y-axis as varying between 15 degrees C. and 40 degrees C., according to the range of temperatures that the TECs of the device 101 are able to provide safely. In an embodiment, the thermal haptic feedback temperature may be correlated linearly with the target parameter setting, as shown by the straight line segment 1011. In a further embodiment, the thermal haptic feedback temperature may be provided according to a distribution that provides most of the thermal haptic feedback at a temperature closer to the middle of the capabilities of the TECs. By way of further example, the thermal haptic feedback temperature may increase, relative to the ambient temperature setting, according to a logarithmic law, as shown by the curve 1013 shown in FIG. 10.

In an embodiment shown in FIG. 11, instructions for a slider and slider handle widget of a graphical user element that may be transmitted to the system using a markup language such as Cascading Style Sheets (CSS) or Hyper Text Markup Language (HTML) or a set of primitives such as those used in Javascript. The system's internet application, such as a browser, may decode the temperature feedback instructions received. By way of illustrative example, a slider widget may be rendered by a web browser when it encounters the following set of instructions:

```
<div class="slidecontainer">
    <input type="range" min="1" max="100" value="50" class="slider" id="myRange">
</div>
```

The associated CSS instructions are shown in FIG. 11. A new set of HTML and CSS markups may be introduced to add and render thermal haptic properties for that same widget, for example, by way of illustration:

```
<div class="slidecontainer">
    <input type="t-range" min="1" max="100" value="50" tmin="0" tmax="1" class="slider" id="myTRange" >
</div>
```

The new type "t-range" may thus indicate that it is a range item with thermal haptic feedback associated to it. In this example, ambient temperature target output settings may be between 1 and 100 (min, max) but new values tmin and tmax are introduced for the thermal haptic feedback temperature as adjusted by the associated slider value. In this example, for value=min, tmin=0 and for value=max, tmax=1. Thus, for example, if the device 101 can reproduce touch temperatures between 15C and 40C, then tmin=0 commands the browser to generate a touch temperature of 15C when the slider is left and tmax=1 commands the browser to generate a touch temperature of 40C when the slider is right. For values in between min and max, a linear proportionality function may be applied. Other options may be added such as law= "log" or law= "linear" to adjust for the variation between min and max as illustrated in FIG. 10.

Similarly, thermal haptic feedback properties may be also annotated within the CSS, for example:

```
.slider {
...
    haptic-temperature: active; /* indicates temperature feedback */
    tmin: 0; /* indicates minimum temperature feedback as minimum of device capabilities */
    tmax: 1; /* indicates temperature feedback as maximum of device capabilities */
    law: log; /* indicates temperature law for value */
}
```

Shorthand markup notation may also be implemented. In a manner similar to color designations in CSS shorthanded as "black", "white", "blue", or "red," thermal haptic feedback may be shorthanded using markers such as "cold", "hot" or "warm." For example, a developer may create a button that feels cold to the touch using shorthand in the markup language as follows:

<button type= "button" temperature-feedback= "cold">
Cold button!
</button>

Figure 12:
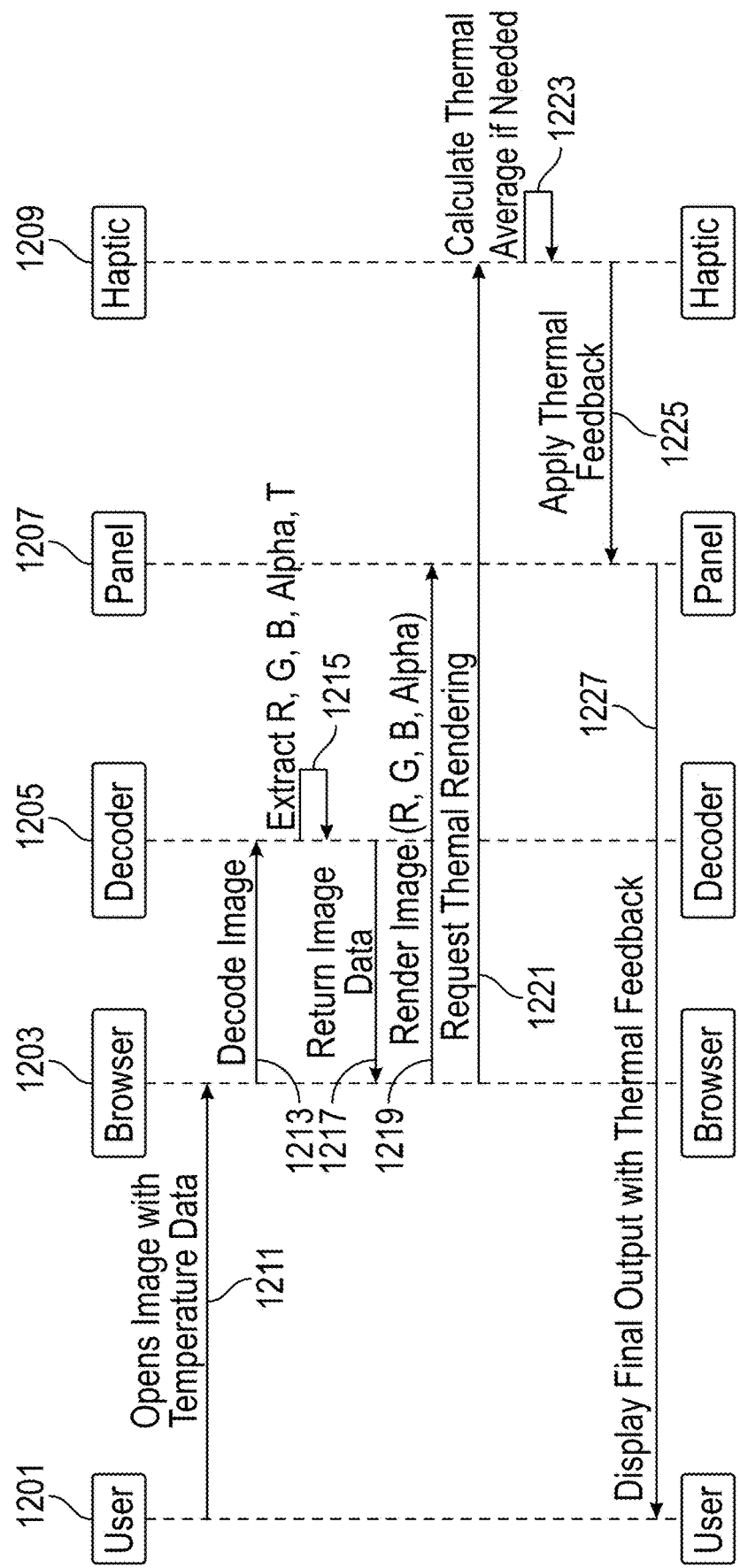
FIG. 12 is an example of a communication flow diagram illustrating signals transmitted to control thermal haptic feedback, according to an aspect of an embodiment.

As shown in FIG. 12, in an embodiment, an internet application such as a browser may interpret a bitmap image containing temperature feedback information in addition to color and transparency information. Such image format may be an extension of an existing format such as Portable Network Graphics (PNG), which would, in addition to RGB coordinates and alpha channel, contain temperature feedback. Once decoded, each pixel may be then identified as (R, G, B, alpha, T). The addition of thermal information may thus be included as a fifth component of such a 5-tuple, for example, representing the temperature as an actual or relative temperature based on a defined scale. For example, a range could be quantized to a range, such as 0-255, similar to the RGB channels. This quantized value may be mapped back to an actual thermal haptic feedback temperature range during rendering.

At 1211 shown in FIG. 12, user 1201 may transmit or download a bitmap image. The bitmap image may contain such pixel by pixel thermal haptic feedback temperature data as part of a tuple of data (R, G, B, alpha, T) for each pixel of the device, or the thermal haptic feedback temperature data may be provided for a group of pixels of the device, for example, for the pixels at a touch area of the slider handle 105, or data for a thermal haptic feedback temperature may be provided for a group of pixels, for example, if a single TEC is associated with a group of pixels.

At 1213, browser 1203 of device 101 may receive the image and pass them to decoder 1205. Decoder 1205 of device 101 may be a component of the browser 1205 or may be a separate module.

At 1215, the decoder 1205 may extract the R, G, B, alpha, T values for each pixel. In an embodiment, the decoder 1205 would process these values such that for some pixels T values would be provided in the image received while for other pixels T values would not be provided. While described as the browser 1203, it will be understood that the browser may be integrated with other system components.

At 1217, the decoder 1205 may return processed image data to the browser 1203.

At 1219, the browser 1203 may render the image with the decoded values on a panel 1207 of device 101. The panel 1207 may be GUI widget of a monitor or display area of the device 101.

At 1221, the browser 1203 may request haptic grid 1209 of the device 101 to provide a thermal haptic feedback according to the T values. In an embodiment, the T values may be transmitted to the haptic grid 1209 only for a target area of the display where the thermal haptic feedback is needed, for example, at the current slider handle 105, or at next slider handle position if scrolling is needed.

At 1223, the haptic grid 1209 may calculate average thermal values, for example, if the thermal grid 1209 lacks the number of TECs necessary to provide the resolution needed to generate T values at every pixel of a target area where thermal haptic feedback is to be generated. Instead of an arithmetic mean, median thermal values or a mode thermal value may be calculated.

At 1225, the haptic grid 1209 generates the thermal haptic feedback by applying voltage to the TEC matrix as needed to obtain target temperatures. The temperature to be obtained by the TEC matrix may have to be calculated to compensate for the glass panel is contact with the user's finger. The touch temperature experienced by a user touching the glass panel over the TEC matrix may be different from the TEC temperature because the glass panel may be at an ambient temperature that dilutes the TEC matrix temperature and may distribute the local TEC temperature over a larger surface.

At 1227, the device 101 provides to the user 1201 the display according the input image, with the thermal haptic feedback.

In an embodiment, a spatial coherence algorithm could be used to store a single thermal value for a block of pixels similar to chroma subsampling in Joint Photographic Experts Group (JPEG) compression, in which color information is stored at a lower resolution than luminance information due to the differences in perception between color variations and brightness variations. Other data storage formats that are optimized for multiple channels of information may be used, for example High Efficiency Image File Format (HEIF), which currently allows for the storage of more than just image data. Adding a thermal channel to this format may be provide efficiencies. When receiving a picture formatted in HEIF, a browser may then graphically render the image using the R, G, B and alpha channels as currently done, but also instruct the device to render the thermal haptic feedback temperature at particular pixel locations. If the thermal resolution of the device is lower than pixel-level, that is, TECs are not provided at each pixel, the browser may convert the instructions automatically, for example, by averaging the values of the requested thermal haptic feedback temperature over the pixel-grid representing the resolution capabilities of the haptic rendering engine on the device.

Color rendering capabilities of an OLED or LCD/LED display may vary with temperature. Therefore, in an embodiment, a feedback loop may compensate for color variation due to temperature increase or decrease in areas around the TECs. The feedback loop may allow for constant color control and/or brightness control around the TEC elements to ensure that color and brightness uniformity notwithstanding temperature variation under the OLED or LCD substrate. For purposes of illustration, if a pixel is to be rendered with a color c and a brightness b, both may be functions of temperature T and may be expressed as:

$$c(T)=c_0+c_1T+c_2.T^2+\ldots c_n.T^n$$

and similarly for the function b(T). Parameters $c_0/b_0$, $c_1/b_1, \ldots c_n/b_n$ may be determined by calibration during a display panel manufacturing process, and may also be dependent on coordinates x, y on the display as a consequence of local temperature variations behind the display caused by electronics, such as a power source or electrodes-thermal sources other than the TECs.

Figure 13:
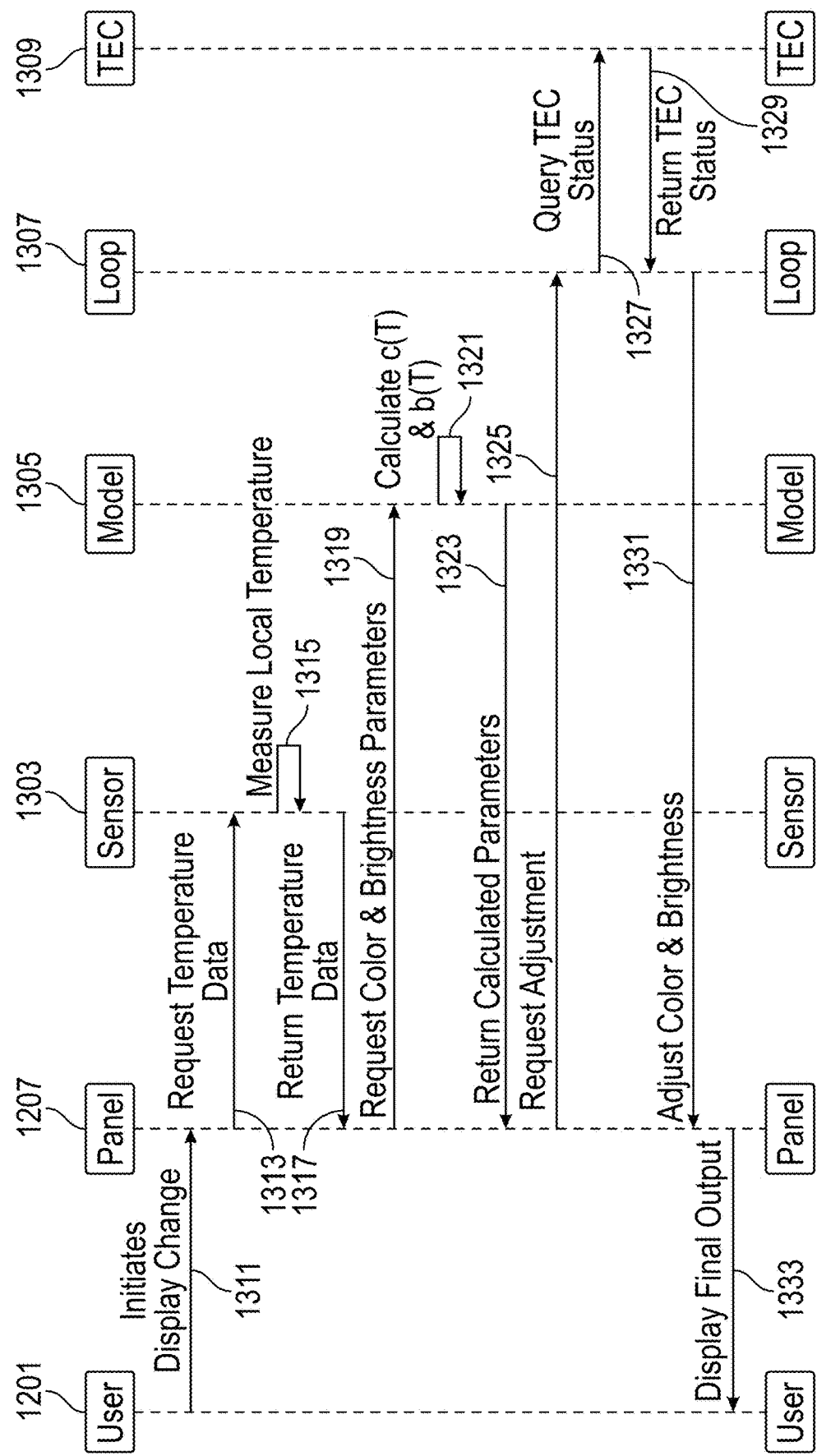
FIG. 13 is an example of a communication flow diagram illustrating signals transmitted for color correction when thermal haptic feedback is provided, according to an aspect of an embodiment.

For this reason, knowing that a pixel needs to be set to a color C and a brightness B, and measuring temperature around the TEC to be T, the system may determine colors as shown in FIG. 13 to adjust in order to achieve the target color C in view of the local temperature T.

At 1311, the user 1201 triggers a display change, for example, by sliding the slider handle 105 of the device 101. The panel 1207 may be a touch panel of device 101 detects the change.

At 1313, the panel 1207 may transmit a request to temperature sensor 1303 to detect a local temperature of the display. The panel 1207 may thought of as including a controller for the device 101.

At 1315, the temperature sensor 1303 may detect local TEC temperatures and/or local display temperatures above the TEC. Or, the sensor 1303 may detect a mean temperature for a location, such as at or near the portion of the display providing the current or a next slider handle 105 or other area of user finger or hand contact.

At 1317, the sensor 1303 transmits the temperature data to the panel 1207. The temperature sensor may continue to measure temperatures and to transmit them in real time to the panel 1207 continuously, in response to request of the panel 1207, or as otherwise requested by the panel 1207.

At 1319, the panel 1207 may request corrected color and/or corrected brightness values from model 1305. The model 1305 may comprise a polynomial model of the color and brightness functions in temperature, as discussed above. In an embodiment, a trained machine learning model may be used to estimate corrected color and/or corrected brightness values consistent with the description above.

At 1321, the model 1305 calculates or estimates the corrected color and/or the corrected brightness values. These may be calculated according to the c (T) and b (T) functions described above.

At 1323, the model 1305 returns the obtained corrected color and/or corrected brightness values.

At 1325, the panel 1207 requests loop 1307 to display the corrected colors and brightness. The loop 1307 may be the LCD/LED/OLED color pixel grid.

At 1327, the loop 1307 may query the TEC grid, or a relevant portions thereof, for status information. For example, the loop 1307 may request temperature and/or applied voltage for all TECs, for TECs that are active, or for TECs that are at or near the area of current contact or likely next contact with the user's finger.

At 1329, the TECs return the status information to the loop 1307. In an embodiment, such TEC status information (temperature and/or voltage and/or active/nonactive status) may be provided to the panel 1207 at regular predetermined intervals, when there is a change in the status information of one or more of the TECs, and/or when touch of the display panel 1207 is indicated.

At 1331, the loop 1307 provides the display based on the corrected colors and brightness.

At 1333, the user 1201 is provided the final output, including the corrected colors and brightness together with the thermal haptic feedback. This process may be repeated as additional user contacts are detected at the display 1207. Also, after a period of time without additional user contact, further color and/or brightness correction may be necessitated by changes in TEC temperature or by prolonged exposure of the OLED pixels to the same TEC temperature. Depending on the temperature range of the thermal feedback engine, such compensation may not be necessary.

Figures 14A, 14B:
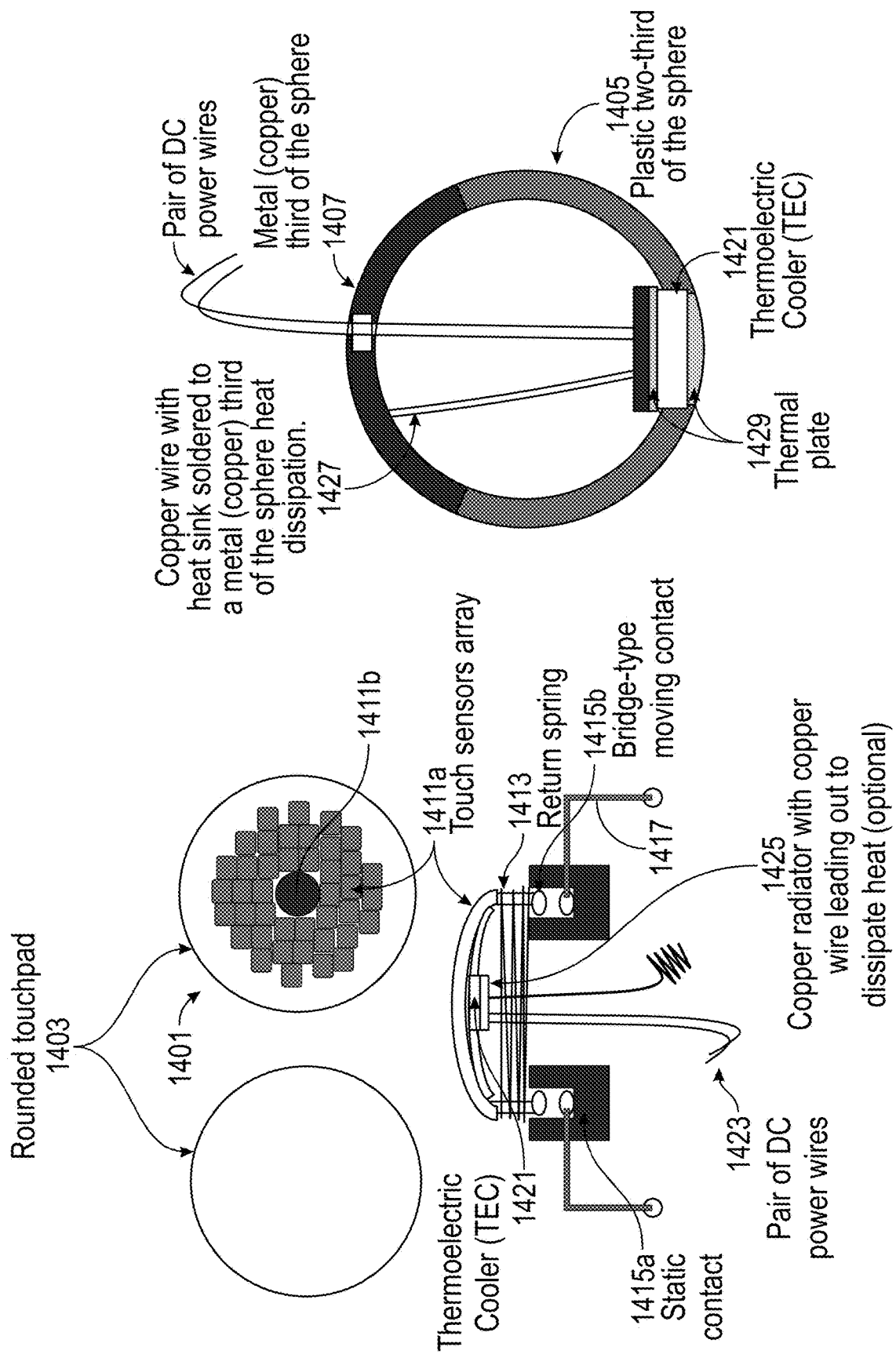
FIGS. 14A-14D illustrate an example of a trackball that provides thermal haptic feedback, according to an aspect of a trackball embodiment of the present disclosure.

A trackball embodiment for providing thermal haptic feedback is also contemplated. As shown in FIG. 14A, are trackball 1401 may comprise a rounded or other touchpad or trackpad 1403 with a touch sensor array 1411a provided therein. In addition, or instead of the touch sensor array 1411a, an optical sensor 1411b may also be positioned therein. A return spring 1413 may be positioned under the touchpad sensor array 1411a so as to return the touchpad sensor array 1411a to its original position after user contact with the touchpad 1403. A static contact 1415a may be provided to house of a bridge-type moving contact 1415b.

Figure 14C:
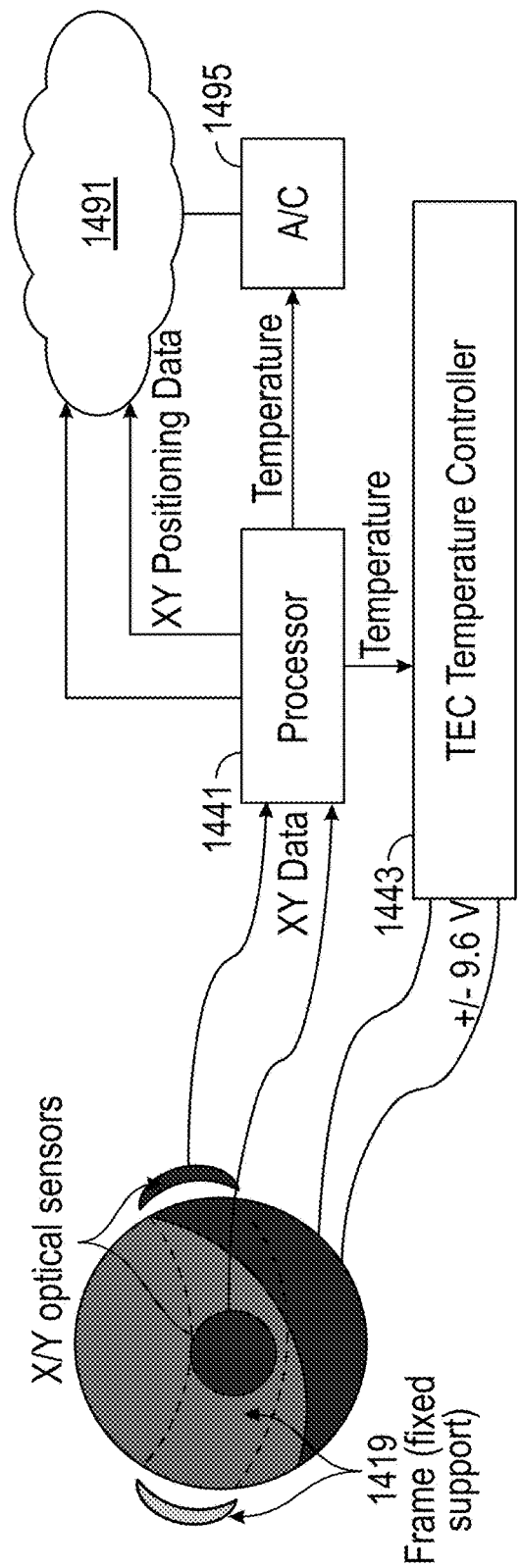

As shown in FIGS. 14A-14C, one or more thermoelectric coolers 1421 may be provided beneath the touch sensor array 1411a. Thermal paste 1429 may be used to secure the one or more TECs 1421 inside the track ball 1401. A pair of direct currents (DC) wires 1423 may be connected to the one or more TECs 1421 such that one of the two wires is connected to each side of each of the one or more TECs 1421. The voltage and the amperes provided to the one or more TECs 1421 may be adjusted as needed to control the temperature of the one or more TEC s1421. Thermal paste 1429 may be highly thermally conductive to allow temperatures of the one or more TECs 1421 to be conveyed to the user's hand as the thermal haptic feedback. A heatsink, radiator, copper wire, or heat pump 1427 may be connected via copper radiator/copper wire 1425 to one or more TECs 1421. As shown in FIG. 14B, which shows components of the trackball 1401 upside down, an upper part of the casing of the trackball—the part that receives the hand of the user—may be made of plastic, and a lower part of the casing may be made of metal to dissipate heat away from the TEC. For example, a majority, or approximately two thirds, of the casing may be plastic. Other combinations of materials and proportions of materials are also contemplated.

In an embodiment, the trackball 1401 may be spun, for example using a thumb, and sensors may record movements along two perpendicular axes, which, in turn, determine the trackball's position. After the user removes a palm or finger from the trackball so that the X, Y data remain unchanged, the processor may calculate the temperature and transmit it for conversion to an appropriate voltage. In winter or during cold weather, the TECs may automatically provide thermal haptic feedback by warming up to indicate an adjustment in a target parameter, for example, a degree to which a side mirror of a vehicle is turned. In hot weather, the TEC may be automatically set to cool down to provide the thermal haptic feedback indicating the target parameter setting (e.g. intensity or value of the target parameter setting).

In an embodiment, since people have different sensitivity to temperature and different contact temperature preferences, different thermal haptic feedback temperate range presets may be selected. For example, the system may provide a menu of options to enable a user to set whether the user prefers hot/warmer thermal haptic feedback or cold/cooler thermal haptic feedback. Further, the system may provide a menu of options to enable a user to set a temperature range for the thermal haptic feedback.

In an embodiment, the system may automatically determine a temperature range for the thermal haptic feedback based on a user profile of ambient temperatures or ambient temperature settings. For example, a profile associated with a vehicle or with a room may indicate that warmer temperatures, for example, mean or median room temperatures of 22-24 degrees C., are preferred by the user, in which case the system may automatically set the thermal haptic feedback range to higher temperatures, for example, 20-50 degrees C., or may automatically set a higher minimal temperature, for example, 22 degrees C., for the thermal haptic feedback range.

According to an embodiment, one or more status indicator light displays, for example, provided as LCD, OLEDs or other LEDs comprising one or more pixels, may be provided on or at the trackball to indicate that the thermal haptic feedback is being provided. In addition, or instead, one or more status indicator light displays may be provided on a monitor or other display that is being controlled by the trackball. The one or more status indicator light displays may indicate whether the thermal haptic indicator is hot or cold, and/or may indicate the intensity, that is, the temperature, of the thermal haptic feedback being provided. For example, the status indicator may glow very bright red when the thermal haptic feedback temperature is very hot, or as hot as the thermal haptic feedback temperature gets, may glow dimly to indicate that the thermal haptic feedback is warm, and may glow quite dimply to indicate that the thermal haptic feedback temperature is barely warmer than room temperature. In addition, or instead, the status indicator light display may glow bright blue, dimly or quite dimly to indicate very cold, cold and barely colder than room temperature thermal haptic feedback temperatures.

In addition, or instead of, controlling the brightness of the status indicator light display, the pixels thereof may be controlled to display colors to indicate how hot or how cold the thermal haptic feedback temperature is. For example, a range of colors from bright red to navy blue may correspond to a range of thermal haptic feedback temperatures ranging from hot to cold.

In an embodiment, instructions for controlling the status indicator light display may be transmitted to the system using a markup language such as Cascading Style Sheets (CSS), Hyper Text Markup Language (HTML), or a set of primitives such as those used in Javascript. The system's internet application, such as a browser, may decode the temperature feedback instructions received. By way of illustrative example, in manner similar to color designations in CSS shorthanded such as "black", "white", "blue", or "red," thermal haptic feedback may be shorthanded using markers such as "cold", "hot" or "warm." For example, a developer may create a button that feels cold to the touch using shorthand in the markup language as follows:

<button type= "button" temperature-feedback= "cold">
Cold button!
</button>

The system may receive markup instructions that specify a color of the status indicator of the light display and temperature data, so that the color and/or brightness of the status indicator of the light display is set based on the corresponding temperature data for the one or more TECs. Or the system may receive markup instructions that specify temperature data for the thermal haptic feedback, and the system may then calculate the corresponding color and/or brightness of the status indicator as a function of the temperature, or may determine the color corresponding to the temperature received by accessing a lookup table.

As shown in FIG. 14C, processor 1441 for the trackball 1401 may receive X, Y positioning data from the touch sensor array 1411*a* and/or from the optical sensor 1411*b*. Based on this positioning data, the processor 1441 may instruct a monitor to position the cursor and/or instruct a device based on the target setting values control by the trackpad 1401. As shown in FIG. 14, processor 1441 may communicate via a network 1491, such as the Internet, or with devices attached thereto. For example, the processor 1441 may control an air conditioning system 1495 in accordance with the parameters controlled by the X, Y data received from the touch sensor array 1411*a* or from the optical sensor 1411*b*. In addition, the processor 1441 may instruct TEC temperature controller 1443 to set a voltage for the one or more TEC's 1421 so as to provide the thermal haptic feedback to the user's hand on the track ball 1401. Accordingly, TEC temperature control of 1443 may set a voltage for the one or more TEC's 1421 according to the temperature requested by processor 1441. The processor 1441 and the TEC temperature controller 1443 may be integrity formed, or may be connected by wireless or wired connection to the track ball 1401, for example, such communication may take place with the trackball 1401 via a network. In an environment, the one or more TECs 1421 may output a single temperature as the thermal haptic feedback.

Figure 14D:
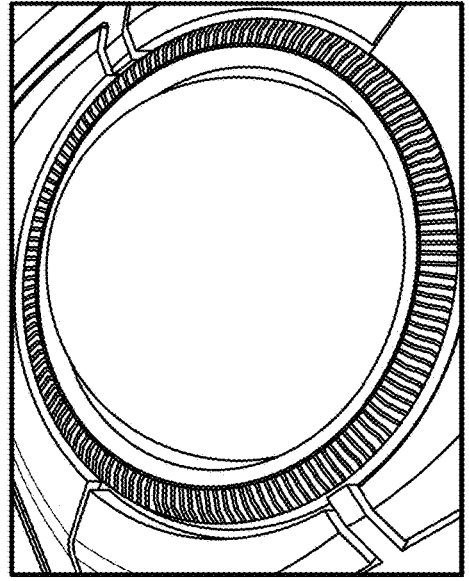

FIG. 14D is a perspective view of an example of a trackball 1401. Also contemplated, in addition to a trackball, are buttons, keys, knobs, joysticks and other types of controllers. Such thermal haptic temperature feedback-enabled device may be used for changing direction and/or intensity, such as a vehicle direction, power seats, camera focus, panning, shutter speed, zooming, heads-up display settings, windshield washer nozzles and speeds, suspension system parameters, audio volume, illumination intensity, massage force and location on the body, and the like.

Figure 15:
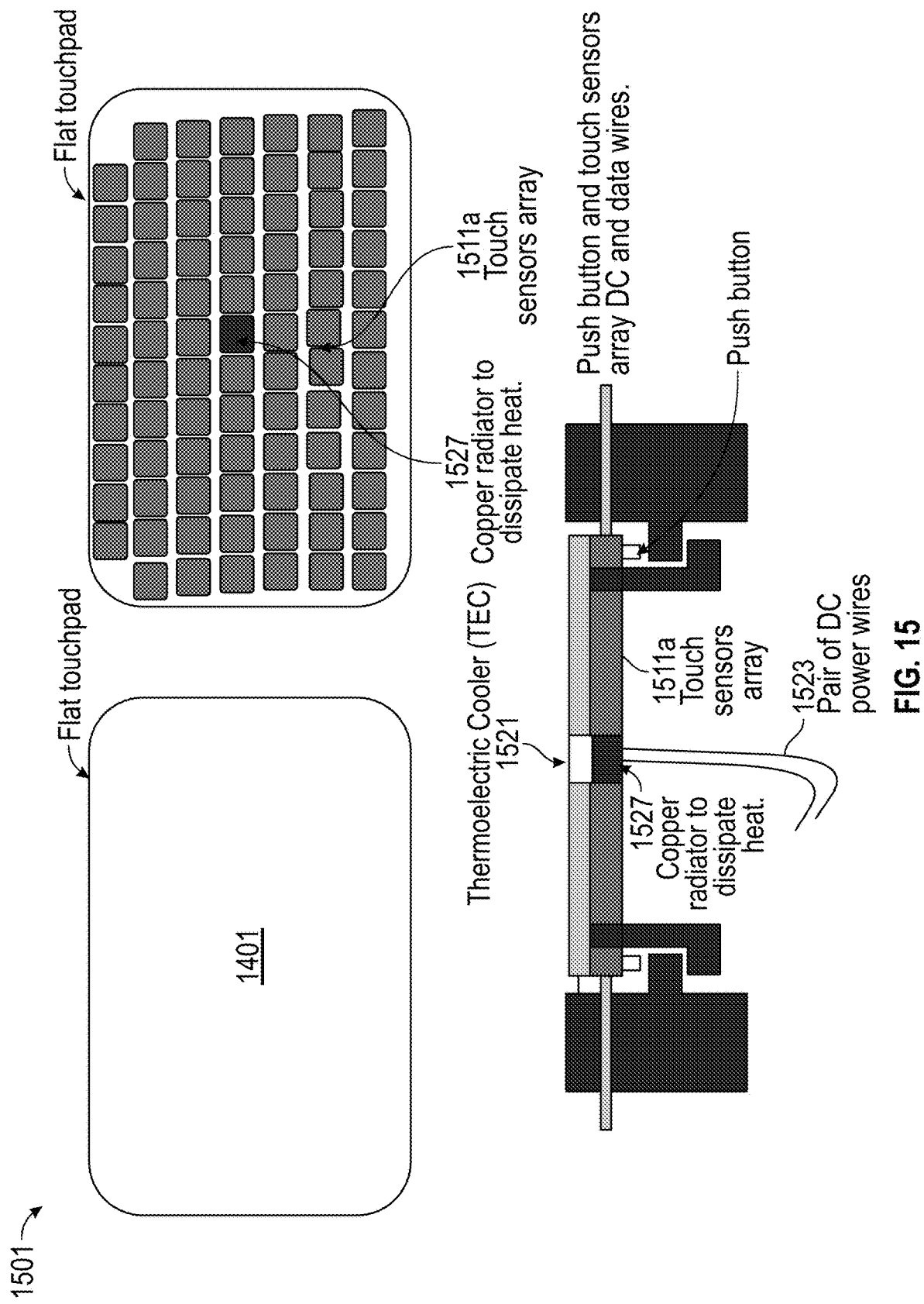
FIG. 15 illustrates an example of a trackball or trackpad that provides thermal haptic feedback, according to an aspect of an embodiment.

FIG. 15 is an example of a flat, round or rounded corner touchpad 1501 that, like the trackball 1401 has one or more TECs to provide the thermal haptic feedback. As shown in FIG. 15, one or more thermoelectric coolers 1521 may be provided beneath the touch sensor array 1511*a*. A pair of direct currents (DC) wires 1523 may be connected to power the one or more TECs 1521 such that one of the two wires is connected to each side of each of the one or more TECs 1521. A heatsink/heat pump/radiator 1527 may be connected to the one or more TECs 1421 to dissipate heat.

In such an arrangement, the temperature for each point of its surface may be determined. By way of example, since the flat round trackpad has a TEC 1521 attached to it in the center, as shown in FIG. 15, means that the temperature value for any x, y coordinate on its surface may be converted radial to Cartesian coordinates.

To do this, we can place a circle at the point we want to measure and calculate the temperature value based on its distance from the center. Assuming a thin circular plate and a heat source at the center, an approximate solution to the temperature distribution may be obtained, assuming stationary thermal conductivity—no temperature change over time, and radial symmetry due to the position of the heat source. In this scenario, the temperature at any point is a function of its radial distance r only from the center. Laplace's equation in polar coordinates (which is the corresponding form of the heat equation for this 2D problem under steady-state conditions) simplifies to:

$$\frac{1}{r}\frac{d}{dr}\left(r\frac{dT}{dr}\right) = 0$$

Considering the symmetry and conditions of the problem, we can further simplify it and look for a solution in the form T(r) using ordinary differential equations allows us to solve for C1 and C2 in terms of T0, T1, and R, after which we have a complete solution for T(r). Therefore, in an embodiment, to find the temperature at any point on the surface of trackpad panel, two temperature sensors may be installed, one in the center and one on the edge of the trackpad panel.

However, we can use only one temperature sensor on the edge of the panel if the TEC controller produces the exact temperature on the TEC. The values of r we use depend on the specific parameters of our physical system (the circular plate with a heat source, in this case). The heat source will occupy a finite area. It may not be a mathematical point but rather a small circle of radius r0. Appropriate values may be determined as follows:

$r0 \leq r \leq R$ where r is the radius of the TEC heat source, and
R is the radius of the plate.

Figure 16:
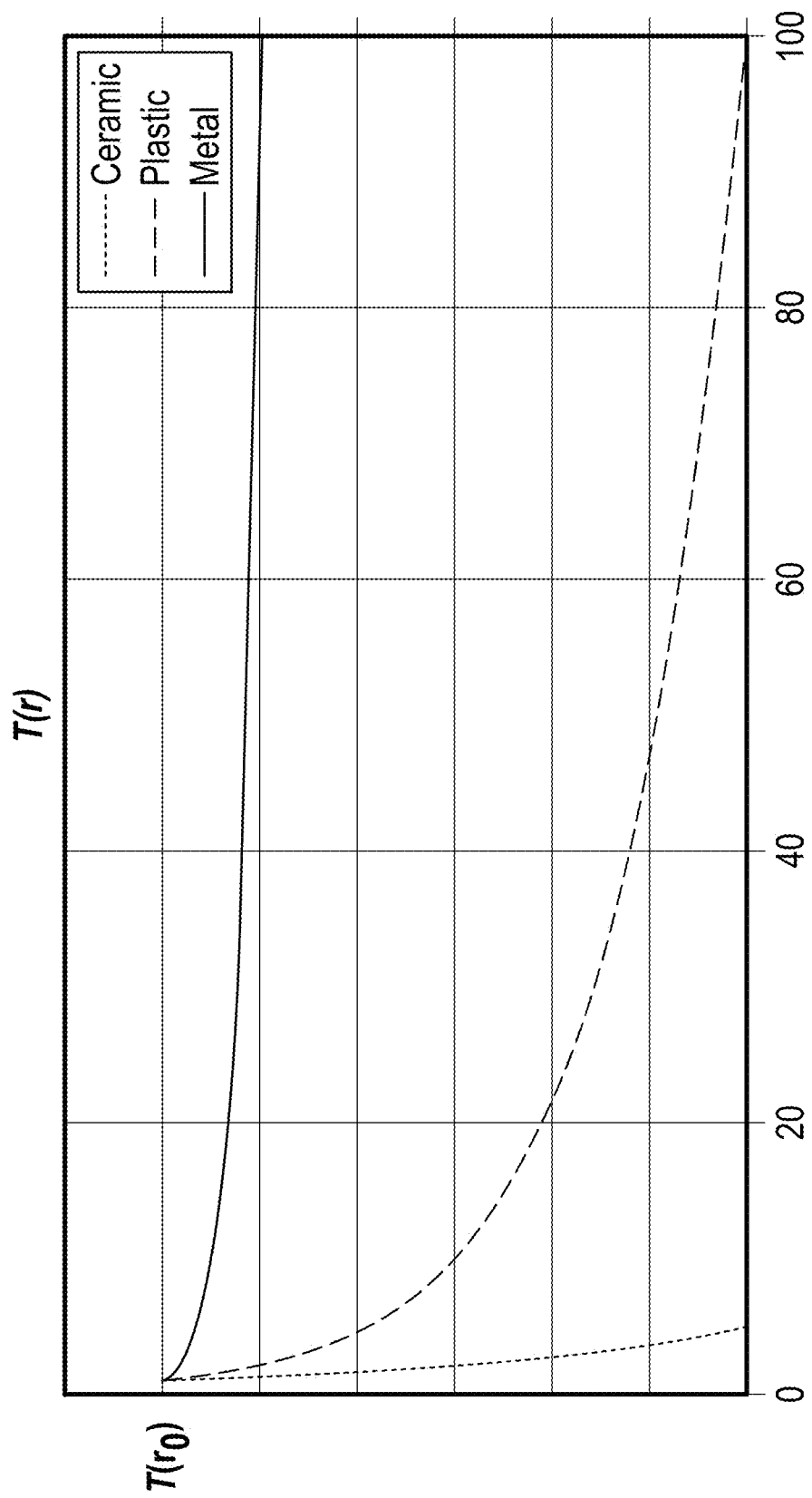
FIG. 16 is a graph showing examples of ambient of heat conductivity of various materials in response to thermal haptic feedback by a TEC.

FIG. 16 shows approximate temperature distribution charts for circular plate surfaces for different materials with a TEC heat source (i.e., T(r0)) in the center with radius r0=1. Metal may not be most suitable because it usually has very high thermal conductivity, i.e., the temperature in the surface center and edges will not be very different. Materials with an average thermal conductivity, such as a plastic surface, may be suitable. However, other materials are also contemplated.

Figure 17:
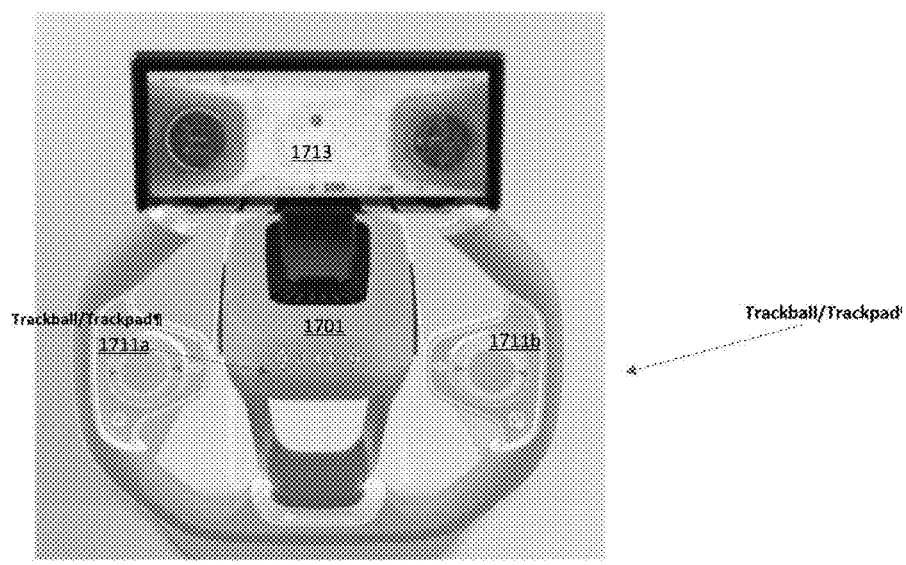
FIG. 17 illustrates examples of trackballs or trackpads provided as part of, or as provided on, a steering wheel of a vehicle, according to an aspect of an embodiment of the disclosure.

FIG. 17 illustrates a steering wheel 1701 with integrated trackballs/trackpads 1711a, 1711b. Also, a touchpad 1713 may be provided in or on the steering wheel 1701. The trackballs/trackpads 1711a, 1711b and the touchpad 1713 may work together in concert such that parameter settings input via the trackballs/trackpads 1711a, 1711b are shown visually on the touchpad 1713. Thermal haptic feedback may be provided by either or both of the trackballs/trackpads 1711a, 1711b and/or may be provided by the touchpad 1713. In addition, or instead, thermal haptic feedback may be provided by the trackballs/trackpads 1711a, 1711b to indicate parameter values shown on the touchpad 1713 that are not controlled by the trackballs/trackpads 1711a, 1711b. For example, a driver may use conventional controls to bring the vehicle to a given speed, and this speed may be shown as a value on the touchpad 1713 and thermal haptic feedback may be provided by the trackballs/trackpads 1711a, 1711b to indicate the speed.

The term "and/or," may be understood to mean "both or either" of the elements thus indicated. Further, unless expressly stated to the contrary, "or" refers to an inclusive or and not to an exclusive or. For example, a condition A or B is satisfied by any one of the following: A is true (or present) and B is false (or not present); A is false (or not present) and B is true (or present); and both A and B are true (or present). Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

Systems and/or methods described above may be applied to, or used in accordance with, other systems and/or methods. In various embodiments, additional elements may be included, some elements may be removed, and/or elements may be arranged differently from what is shown. Alterations, modifications and variations can be effected to the particular embodiments by those of skill in the art without departing from the scope of the present application, which is defined solely by the claims appended hereto.

What is claimed is:

1. A method comprising:
receiving an indication of an adjustment at a first portion of a touch user interface from a first user touch position to a second user touch position;
determining a thermal haptic feedback temperature based on the adjustment at the first portion of the touch user interface and based on a relative difference between the first user touch position and the second user touch position; and
controlling a matrix of temperature actuating elements at the touch user interface to provide the thermal haptic feedback temperature by causing a first temperature actuating element of the matrix of temperature actuating elements to provide a temperature output based on the thermal haptic feedback temperature,
wherein the first temperature actuating element is positioned at the first portion of the touch user interface, and temperature actuating elements of the matrix of temperature actuating elements positioned outside the first portion of the touch user interface are controlled not to provide the temperature output provided by the first temperature actuating element.

2. The method of claim 1, wherein the first portion of the touch user interface comprises a moveable graphical user interface widget of a touchscreen device.

3. The method of claim 2, wherein the matrix of temperature actuating elements comprises Peltier devices arranged in a touchscreen device such that more of the Peltier devices are positioned at a portion of the touch user interface providing the moveable graphical user interface widget than at comparably sized other portions of the touch user interface.

4. The method of claim 1, wherein portions of the touch user interface other than at the first portion are not controlled to provide a temperature output.

5. The method of claim 1, further comprising:
receiving a temperature reading from a temperature sensor at the first portion of the touch user interface;
calculating, as a function of the temperature reading, a target color and a target brightness;
controlling one or more pixels at the first portion of the touch user interface to adjust to the target color; and
controlling the one or more pixels at the first portion of the touch user interface to adjust to the target brightness.

6. The method of claim 1, wherein the determining of the thermal haptic feedback temperature is based on a value indicated by the adjustment at the first portion of the touch user interface, and further comprising:
adjusting an ambient temperature setting for a space according to the value indicated by the adjustment at the first portion of the touch user interface; and
generating a signal to set an ambient temperature for the space based on the adjusted ambient temperature setting.

7. The method of claim 1, wherein the touch user interface is provided by a touchscreen device, and the first portion of the touch user interface is a point of user physical contact with the touch user interface.

8. The method of claim 1, further comprising:
determining a future likely point of user physical contact with the touch user interface,
wherein the first portion of the touch user interface is the future likely point of user physical contact with the touch user interface.

9. The method of claim 1, further comprising:
receiving markup instructions comprising pixel color and corresponding temperature data,
wherein the determining of the temperature setting for a pixel is performed according to the corresponding temperature data.

10. The method of claim 1, wherein the matrix of temperature actuating elements comprises thermoelectric coolers positioned such that a thermoelectric cooler corresponds to each pixel of the first portion of the touch user interface.

11. The method of claim 1, wherein the thermal haptic feedback temperature is cooler than an ambient temperature when the second user touch position indicates a lower setting relative to the first user touch position, and wherein the thermal haptic feedback temperature is warmer than the ambient temperature when the second user touch position indicates a higher setting relative to the first user touch position.

12. A system comprising:
communication circuitry configured to receive an indication of an adjustment at a first portion of a touch user interface from a first user touch position to a second user touch position; and
processing circuitry configured:
to determine a thermal haptic feedback temperature based on the adjustment at the first portion of the touch user interface and based on a relative difference between the first user touch position and the second user touch position; and
to control a matrix of temperature actuating elements at the touch user interface to provide the thermal haptic feedback temperature by causing a first temperature actuating element of the matrix of temperature actuating elements to provide a temperature output based on the thermal haptic feedback temperature,
wherein the first temperature actuating element is positioned at the first portion of the touch user interface, and temperature actuating elements of the matrix of temperature actuating elements positioned outside the first portion of the touch user interface are controlled not to provide the temperature output provided by the first temperature actuating element.

13. The system of claim 12, wherein the first portion of the touch user interface comprises a moveable graphical user interface widget of a touchscreen device.

14. The system of claim 13, wherein the matrix of temperature actuating elements comprises Peltier devices arranged in a touchscreen device such that more of the Peltier devices are positioned at a portion of the touch user interface providing the moveable graphical user interface widget than at comparably sized other portions of the touch user interface.

15. The system of claim 12, wherein the system is configured:
to receive a temperature reading from a temperature sensor at the first portion of the touch user interface;
to calculate, as a function of the temperature reading, a target color and a target brightness;
to control one or more pixels at the first portion of the touch user interface to adjust to the target color; and
to control the one or more pixels at the first portion of the touch user interface to adjust to the target brightness.

16. The system of claim 12, wherein the determining of the thermal haptic feedback temperature is based on a value indicated by the adjustment at the first portion of the touch user interface, and the system is configured:
to adjust an ambient temperature setting for a space according to the value indicated by the adjustment at the first portion of the touch user interface; and
to generate a signal to set an ambient temperature for the space based on the adjusted ambient temperature setting.

17. The system of claim 12, wherein the touch user interface is provided by a touchscreen device, and the first portion of the touch user interface is a point of user physical contact with the touch user interface.

18. The system of claim 12, wherein the system is configured:
to determine a future likely point of user physical contact with the touch user interface,
wherein the first portion of the touch user interface is the future likely point of user physical contact with the touch user interface.

19. The system of claim 12, wherein the system is configured:
receiving markup instructions comprising pixel color and corresponding temperature data,
wherein the determining of the temperature setting for a pixel is performed according to the corresponding temperature data.

20. The system of claim 12, wherein the matrix of temperature actuating elements comprises thermoelectric coolers positioned such that a thermoelectric cooler corresponds to each pixel of the first portion of the touch user interface.

\* \* \* \* \*